US009575822B2

United States Patent
Liu et al.

(10) Patent No.: US 9,575,822 B2
(45) Date of Patent: Feb. 21, 2017

(54) TRACKING A RELATIVE ARRIVAL ORDER OF EVENTS BEING STORED IN MULTIPLE QUEUES USING A COUNTER USING MOST SIGNIFICANT BIT VALUES

(71) Applicant: GLOBALFOUNDRIES Inc., Grand Cayman (KY)

(72) Inventors: Zhi G. Liu, Shanghai (CN); Megan P. Nguyen, Austin, TX (US); Bill N. On, Austin, TX (US); Lyndsi R. Parker, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 40 days.

(21) Appl. No.: 14/449,666

(22) Filed: Aug. 1, 2014

(65) Prior Publication Data
US 2016/0034321 A1 Feb. 4, 2016

(51) Int. Cl.
G06F 13/00 (2006.01)
G06F 9/54 (2006.01)
G06F 9/48 (2006.01)

(52) U.S. Cl.
CPC ............ *G06F 9/542* (2013.01); *G06F 9/4881* (2013.01); *G06F 9/546* (2013.01)

(58) Field of Classification Search
CPC ......... G06F 9/542; G06F 9/4481; G06F 9/546
IPC .................... G06F 9/542, 9/544, 9/4481, 9/546
See application file for complete search history.

(56) References Cited

U.S. PATENT DOCUMENTS

| 4,646,294 A | * | 2/1987 | Eliscu | H04Q 11/04 370/412 |
| 4,969,120 A | | 11/1990 | Azevedo et al. | |
| 5,537,400 A | * | 7/1996 | Diaz | H04L 12/5601 370/396 |
| 6,389,019 B1 | | 5/2002 | Fan et al. | |

(Continued)

FOREIGN PATENT DOCUMENTS

| CN | 100463451 | 2/2009 |
| EP | 0924623 A3 | 5/2000 |

(Continued)

OTHER PUBLICATIONS

Notice of Allowance, mailing date May 18, 2015, U.S. Appl. No. 13/738,204, filed Jan. 10, 2013, In re Dinkjian, 12 pages.

(Continued)

*Primary Examiner* — H S Sough
*Assistant Examiner* — Phuong N Hoang
(74) *Attorney, Agent, or Firm* — DeLio, Peterson & Curcio, LLC; David R. Pegnataro

(57) ABSTRACT

An order controller stores each received event in a separate entry in one of at least two queues with a separate counter value set from an arrival order counter at the time of storage, wherein the arrival order counter is incremented after storage of each of the received events and on overflow the arrival order counter wraps back to zero. The order controller calculates an exclusive OR value of a first top bit of a first counter for a first queue from among the at least two queues and a second top bit of a second counter for a second queue from among the at least two queues. The order controller compares the exclusive OR value with a comparator bit to determine whether a first counter value in the first counter was stored before a second counter value in the second counter.

8 Claims, 12 Drawing Sheets

(56) References Cited

U.S. PATENT DOCUMENTS

| | | | |
|---|---|---|---|
| 6,556,572 | B1 | 4/2003 | Ishida |
| 6,877,077 | B2 | 4/2005 | McGee et al. |
| 7,177,982 | B2 | 2/2007 | Barrick |
| 7,230,923 | B2 | 6/2007 | Onvural et al. |
| 7,400,629 | B2 | 7/2008 | Blanc et al. |
| RE40,904 | E | 9/2009 | Garde |
| 8,028,052 | B2 | 9/2011 | Larkin et al. |
| 8,099,452 | B2 | 1/2012 | Chkodrov et al. |
| 8,131,895 | B2 | 3/2012 | Pope et al. |
| 8,171,205 | B2 | 5/2012 | Royer et al. |
| 9,189,433 | B2 * | 11/2015 | Dinkjian ............ G06M 3/00 |
| 2004/0190537 | A1 | 9/2004 | Ferguson et al. |
| 2005/0053078 | A1 | 3/2005 | Blanc et al. |
| 2007/0260777 | A1 | 11/2007 | Timpe et al. |
| 2008/0072221 | A1 | 3/2008 | Chkodrov et al. |
| 2010/0054268 | A1 * | 3/2010 | Divivier ............ G06F 13/4022 370/412 |
| 2012/0131246 | A1 | 5/2012 | Jeong et al. |
| 2012/0281703 | A1 | 11/2012 | Agerholm et al. |
| 2014/0169517 | A1 | 6/2014 | Dinkjian et al. |
| 2014/0173631 | A1 | 6/2014 | Dinkjian et al. |

FOREIGN PATENT DOCUMENTS

| | | |
|---|---|---|
| EP | 1615378 A1 | 1/2006 |
| WO | 2011067406 A1 | 6/2011 |

OTHER PUBLICATIONS

U.S. Appl. No. 14/474,087, filed Aug. 30, 2014, In re Liu, 42 pages.
Notice of Allowance, mailing date Feb. 2, 2015, U.S. Appl. No. 13/718,267, filed Dec. 18, 2012, In re Dinkjian, 44 pages.
Non-final Office Action, mailing date Oct. 2, 2014, U.S. Appl. No. 13/718,267, filed Dec. 18, 2012, In re Dinkjian, 48 pages.
Notice of Allowance, mailing date Feb. 2, 2015, U.S. Appl. No. 13/738,204, filed Jan. 10, 2013, In re Dinkjian, 44 pages.
Non-Final Office Action, mailing date Oct. 3, 2014, U.S. Appl. No. 13/738,204, filed Jan. 10, 2013, In re Dinkjian, 45 pages.
Anandkumar et al, "Seeing Through Black Boxes: Tracking Transactions through Queues under Monitoring Resource Constraints", Feb. 9, 2010, accessed online from <http://www.mit.edu/~animakum/pubs/AnandkumarPE10.pdf>, 23 pages.
Hsieh, et al. "Abstraction Techniques for Verification of Multiple Tightly Coupled Counters, Registers and Comparators", Department of Electrical Engineering, University of Pittsburgh, retrieved from the Internet on Nov. 3, 2012.
Dahl, et al, "Event List Management in Distributed Simulation", retrieved from the Internet on Nov. 3, 2012 from http://www.google.com/url?sa=t&rct=j&q=&esrc=s&source=web&cd=2&ved=0CCsQFjAB&url=http%3A%2F%2Fciteseerx.ist.psu.edu%2Fviewdoc%2Fdownload%3Fdoi%3D10.1.1.75.4478%26rep%3Drep1%26type%3Dpdf&ei=jFKYUMDBIPSA2AXsolHIAw&usg=AFQjCNH_aOXewEr9tMiEU4jdj0UTiLNcTA&sig2=nPJ1qoaQJpPNcHdmMSQpig, 8 pages.

* cited by examiner

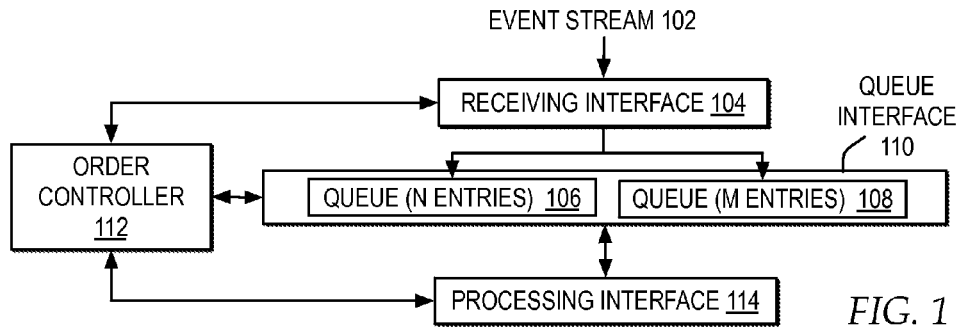
FIG. 1
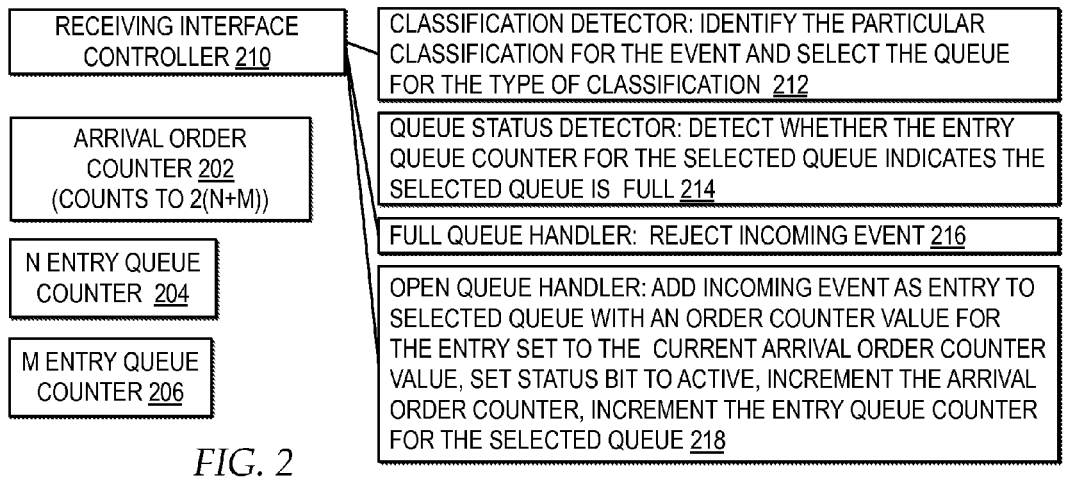
FIG. 2
EACH QUEUE ENTRY 302:
| EVENT REGISTER 304 | ORDER COUNTER REGISTER 306 | STATUS BIT REGISTER 308 |
|---|---|---|
| EVENT IDENTIFIER 310 (ATTRIBUTES: STARTING ADDRESS, SIZE OF TRANSACTION, BYTE-ENABLE) | ORDER COUNTER VALUE 312 (THE ARRIVAL ORDER COUNTER VALUE TO INDICATE RELATIVE ARRIVAL ORDER) | STATUS BIT 314 (STATUS BIT TO INDICATE WHETHER THE EVENT IS PENDING (ACTIVE)(1) OR HAS BEEN PROCESSED (DONE)(0) |
FIG. 3

| | Q1 604 | |
|---|---|---|
| | EVENT | COUNTER [0:3] |
| FRONT→0 | A | 0000 |
| | G | 0110 |
| | N | 1101 |
| | O | 1110 |
| | Q | 0000 |
| | T | 0011 |
| | Z | 1001 |

| | Q2 606 | |
|---|---|---|
| | EVENT | COUNTER [0:3] |
| FRONT→0 | B | 0001 |
| | F | 0101 |
| | L | 1011 |
| | R | 0001 |
| | U | 0100 |
| | Y | 1000 |
| | a | 1010 |

| | Q3 608 | |
|---|---|---|
| | EVENT | COUNTER [0:3] |
| FRONT→0 | C | 0010 |
| | D | 0011 |
| | I | 1000 |
| | M | 1100 |
| | S | 0010 |
| | V | 0101 |
| | W | 0110 |

| | | |
|---|---|---|
| | EVENT | COUNTER [0:3] |
| FRONT→0 | E | 0100 |
| | H | 0111 |
| | J | 1001 |
| | K | 1010 |
| | P | 1111 |
| | X | 0111 |
| | b | 1011 |

# TRACKING A RELATIVE ARRIVAL ORDER OF EVENTS BEING STORED IN MULTIPLE QUEUES USING A COUNTER USING MOST SIGNIFICANT BIT VALUES

TECHNICAL FIELD

The embodiment of the invention relates generally to managing queues and particularly to tracking a relative arrival order of events being stored in multiple queues using most significant (MSB) values when a counter value from a counter is stored with each arriving event to indicate arrival order and the counter is incremented with each arriving event, where the counter wraps back to zero on overflow.

DESCRIPTION OF THE RELATED ART

In electronic systems that handle streams of events, one or more queues are often positioned to store events until the events can be processed. When events arriving in a stream are stored into multiple, separate queues, if an in-order setting is designated, the events may need to be processed from the queues in the same order that the events arrived in the stream.

BRIEF SUMMARY

In view of the foregoing, there is a need for a method, system, and computer program product for calculating a relative arrival order of events being stored in multiple queues when a counter value from a counter is stored with each arriving event to indicate arrival order and the counter is incremented with each arriving event, where the counter wraps back to zero on overflow.

In another embodiment, a system for tracking a relative arrival order of a plurality of events stored in at least two queues comprises a processor, coupled with a memory, and configured to perform the actions of storing each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero. The processor is configured to perform the actions of calculating an exclusive OR value of a first top bit of a first counter for a first queue from among the at least two queues and a second top bit of a second counter for a second queue from among the at least two queues. The processor is configured to perform the actions of comparing the exclusive OR value with a comparator bit to determine whether a first counter value in the first counter was stored before a second counter value in the second counter, wherein the result of comparison of the exclusive OR value with the comparator bit determines whether the counter with the larger value was stored first or whether the counter with the smaller value was stored first.

In another embodiment, a computer program product for tracking a relative arrival order of a plurality of events stored in at least two queues comprises a computer readable storage medium having program instructions embodied therewith. The program instructions are executable by a processor to cause the processor to store each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero. The program instructions are executable by a processor to cause the processor to calculate an exclusive OR value of a first top bit of a first counter for a first queue from among the at least two queues and a second top bit of a second counter for a second queue from among the at least two queues. The program instructions are executable by a processor to cause the processor to compare the exclusive OR value with a comparator bit to determine whether a first counter value in the first counter was stored before a second counter value in the second counter, wherein the result of comparison of the exclusive OR value with the comparator bit determines whether the counter with the larger value was stored first or whether the counter with the smaller value was stored first.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 illustrates a block diagram of one example of an system in which the relative arrival order is tracked for events being stored in multiple queues;

FIG. 2 illustrates a block diagram of one example of components of an order controller for a multiple queue interface for handling selection of an available queue for arriving events and tracking the relative arrival order of events placed in one of the multiple queues;

FIG. 3 illustrates a block diagram of one example of values stored with each queue entry, including an order counter value and a status bit;

DETAILED DESCRIPTION

Figure 4:
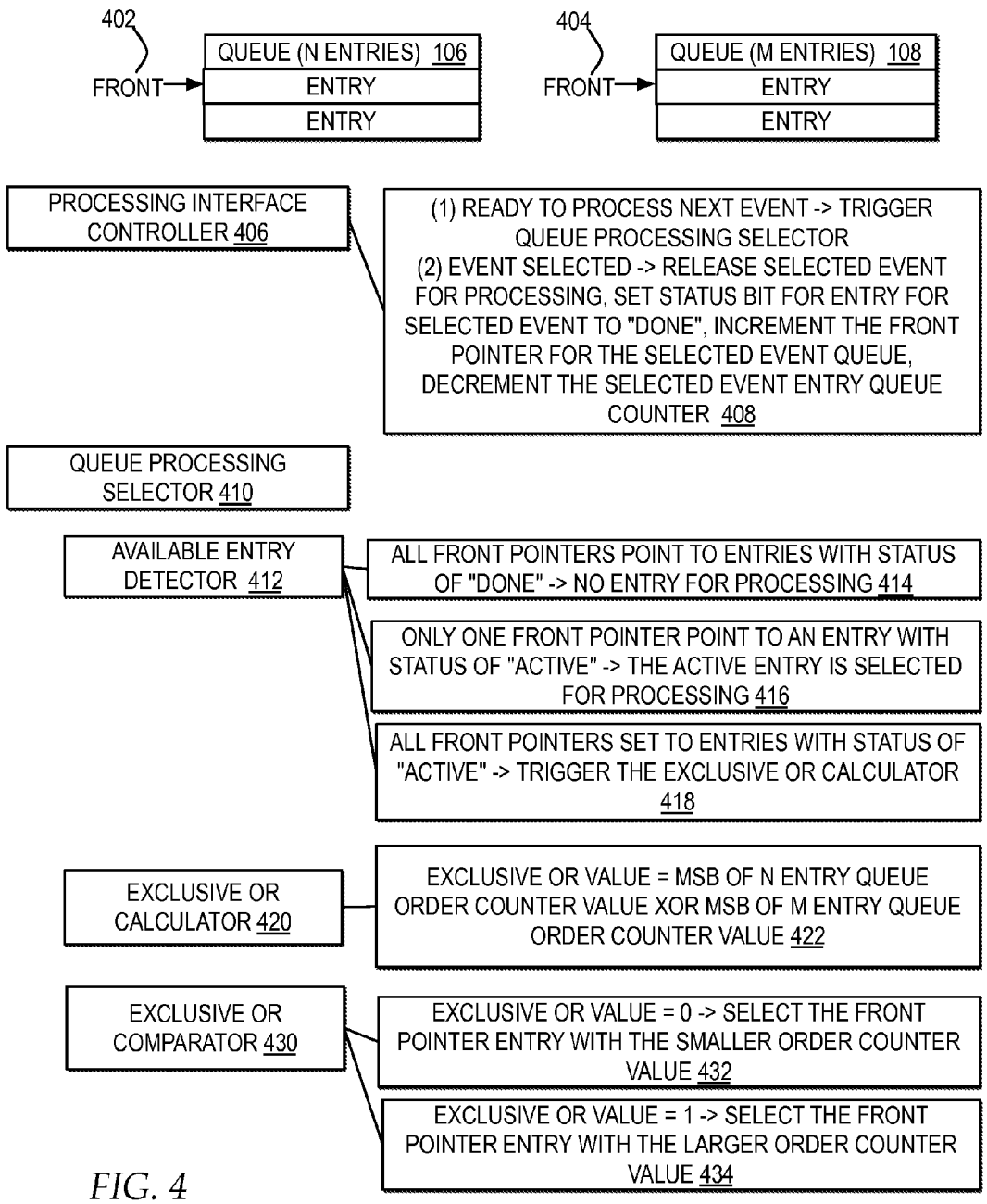
FIG. 4 illustrates a block diagram of examples of components of an order controller for a multiple queue interface for handling event selection of events placed in one of multiple queues to be processed from the queues in order of arrival.
Figure 5A:
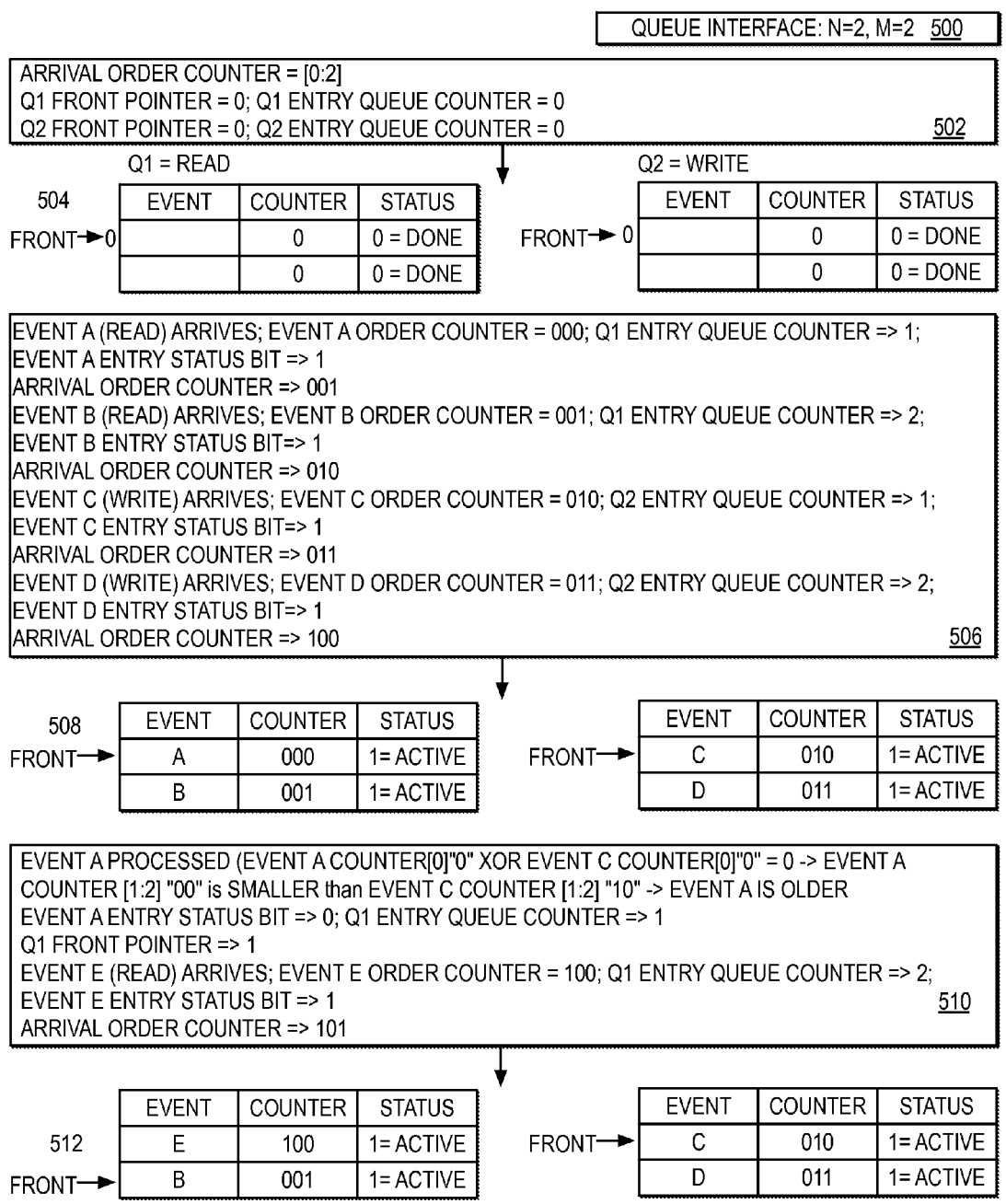
FIGS. 5A, 5B, 5C, and 5D illustrate a block diagram of one example of an order controller tracking a relative arrival order of events being stored in multiple queues when a counter value from a counter is stored with each arriving event to indicate arrival order and the counter is incremented with each arriving event, where the counter wraps back to zero on overflow.
Figure 5B:
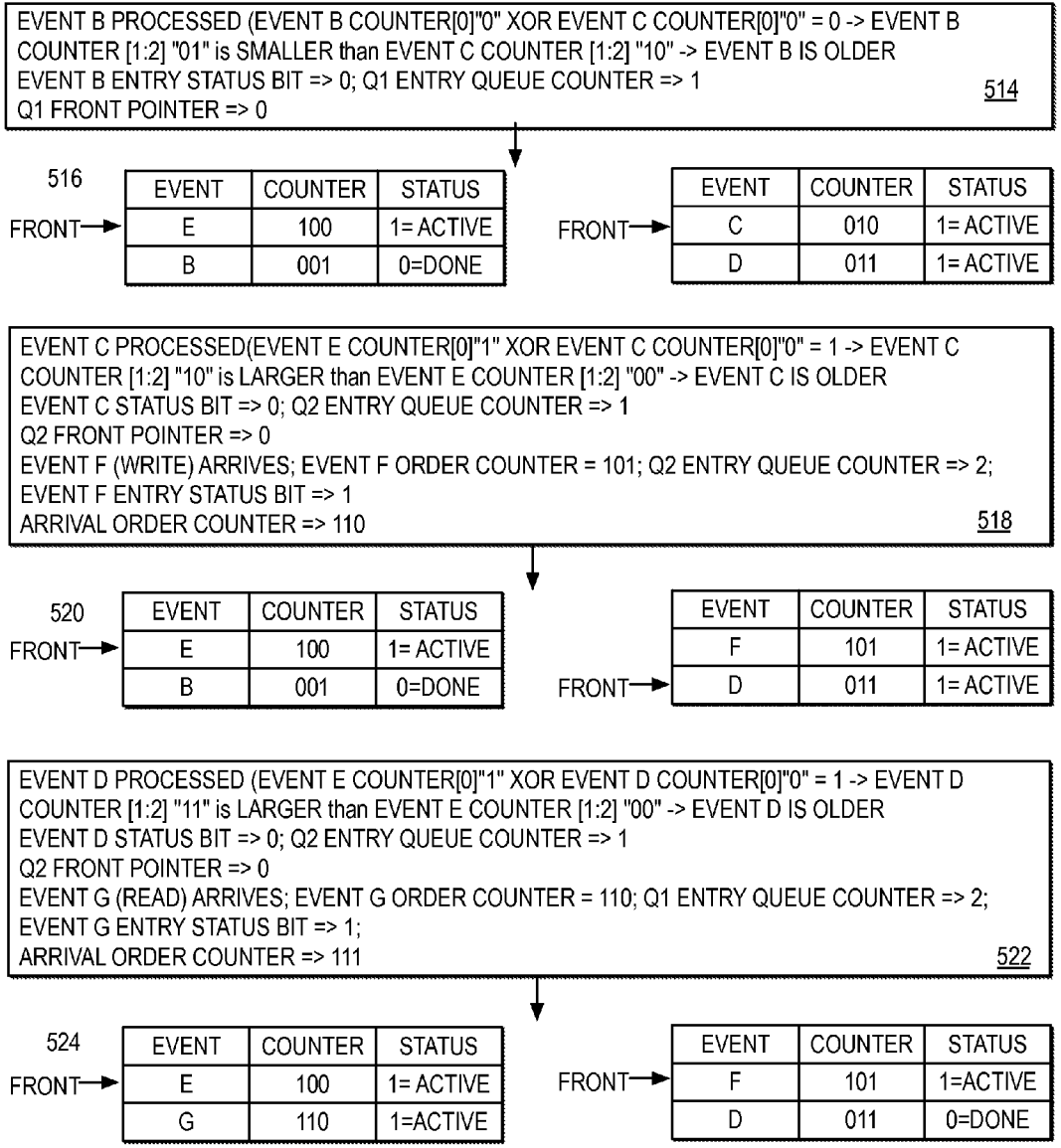
Figure 5C:
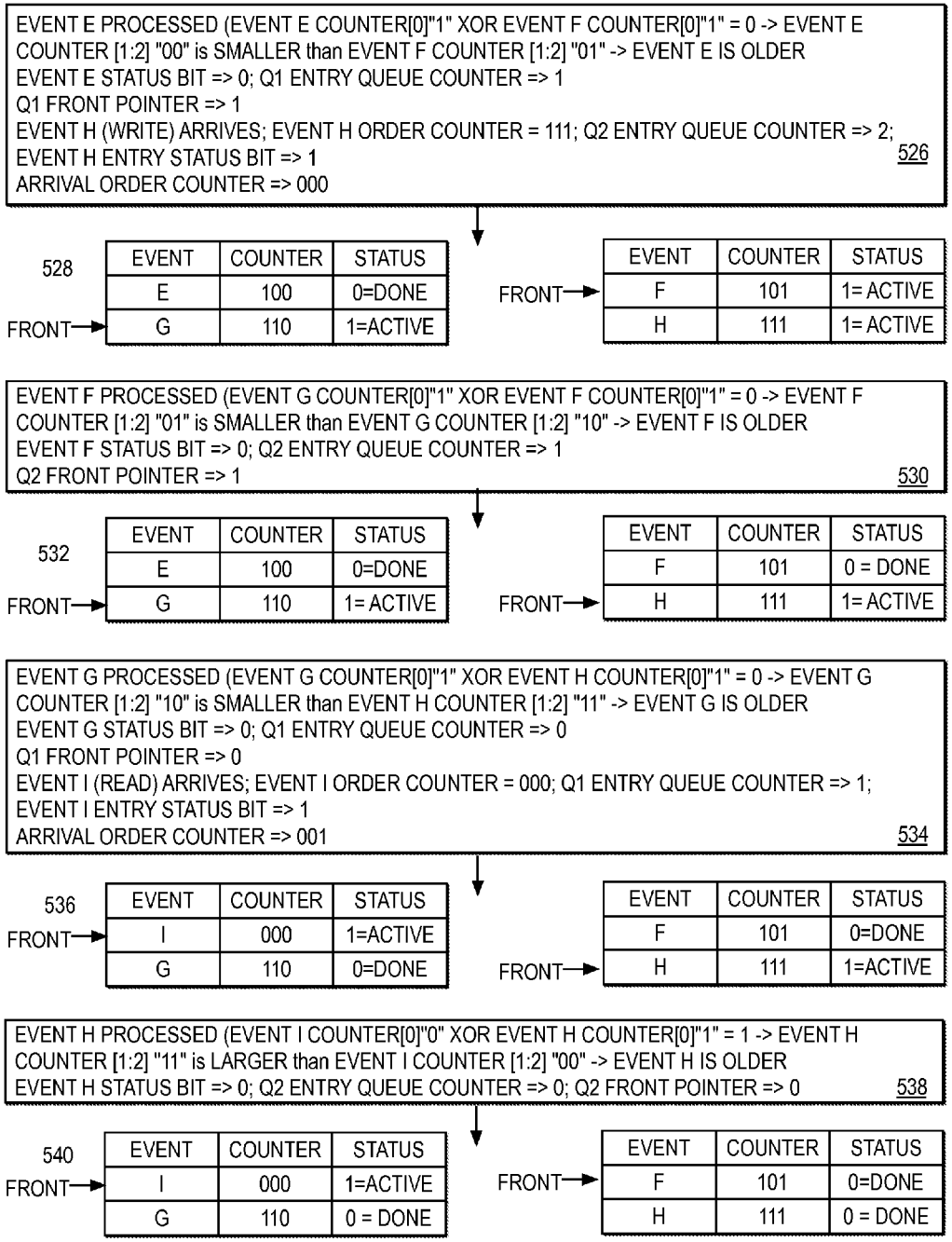
Figure 5D:
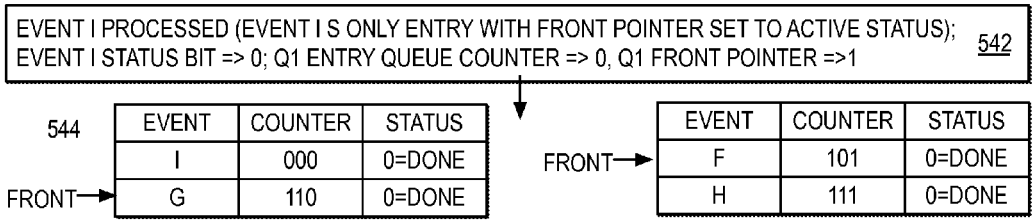

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of an system in which the relative arrival order is tracked for events being stored in multiple queues.

In the example, a receiving interface 104 receives event stream 102 from one or more devices. In the example, event stream 102 may represent a stream of events arriving in a particular order at receiving interface 104 from one or more devices over one or more periods of time. In the example, receiving interface 104 identifies one or more classifications of each event received in event stream 102 and selects a queue associated with each event, based on the classification, from among one or more queues in a queue interface 110. In one example, receiving interface 104 may identify whether each event in event stream 102 is classified as a read request or as a write request. In other examples, receiving interface 104 may identify whether each event in event stream 102 is classified as additional or alternate types of requests.

In the example, queue interface 110 includes a queue 106 of a depth of N entries and a queue 108 of a depth of M entries. In one example, only events classified as read requests in event stream 102 are stored in queue 106 and only events classified as write requests in event stream 102 are stored in queue 108. In other embodiments, queue interface 110 may include a single queue or may include additional queues. For example, in another embodiment, queue interface 110 may include multiple queues in which read requests are stored and multiple queues in which write requests are stored. In one embodiment, the depth of N entries of queue 106 is equal to the depth of M entries of queue 108. In another embodiment, the depth of N entries of queue 106 is not equal to the depth of M entries of queue 108.

In the example, an order controller 112 may send control signals to and between one or more of receiving interface 104, queue interface 110, and a processing interface 114. In another embodiment, one or more components of order controller 112 may be implemented within one or more interfaces or order controller 112 may be implemented through multiple separate controllers.

In one example, order controller 112 controls whether events received in event stream 102 at receiving interface 104 are rejected or placed in a queue. In addition, order controller 112 controls the selection of the particular queue in which a non-rejected event is placed within queue interface 110. Further, order controller 112 controls tracking of the relative arrival order of each event in each queue by storing a order counter value in an order counter register with each event in each queue, where the counter value is set by an arrival order counter that increments for each event arrival and wraps back to zero on overflow. In addition, in the example, order controller 112 controls the selection of the next active event from among queue 106 and queue 108 to be processed by processing interface 114 by determining, based on the order counter values assigned to each next active event entry in queue 106 and queue 108, which of the order counter values is the oldest, and marks the selected event entry as no longer active. In one example, order controller 112 determines which of the order counter values assigned to each of the next active events was stored first, and therefore is the oldest, by performing an exclusive OR operation of the most significant bit (MSB) of the order counter values assigned to the next two active events and comparing the exclusive OR value with "0" to determine whether to select the next active entry stored with the smaller or larger of the order counter values. In particular, in one example, the MSB may represent the top bit of the arrival order counter value, which when stored as an order counter value may represent an overflow bit for purposes of tracking the relative arrival order of entries. In the example, if the exclusive OR value equals "0", then the order counter value with the lower bits with the smaller value is the oldest entry, otherwise the order counter value with the lower bits with the larger value is the oldest entry. By performing an exclusive OR operation of the MSB of the order counter values assigned to the next two active events and comparing the exclusive OR value with "0" to determine which counter value was stored first, the arrival order of the next two active events can be tracked from the order counter values stored with the events, but independent of an actual sequential order shown in the order counter values.

In one example, an exclusive OR operation (XOR) is a logical operation that outputs "true" or "1", whenever both inputs differ. For example, when the MSBs of the order counter values assigned to the next two active events are compared using a exclusive OR operation, if the top bits are the same, such as either both "0" or both "1", the output of exclusive OR operation is "0" or "false" and when the top bits are different, the output of the exclusive OR operation is "1" or "true".

In the example, by performing an exclusive OR operation of the MSBs of the order counter values assigned to the next two active events and comparing the exclusive OR value with "0" to determine whether to select the next active entry stored with the smaller or larger of the lower bits of the order counter values, a counter value alone may be stored with each event entry to track the relative arrival order of events placed in multiple queues, without necessitating any additional counting of each overflow of a counter and without necessitating a larger counter. In one example, the arrival order counter is set to count to "2(N+M)", where N is the depth of entries in queue 106 and M is the depth of entries in queue 108, and where the MSB, or top bit, of the arrival order counter effectively represents an overflow bit for purposes of tracking the relative arrival order of entries. In another example, where queue interface 110 includes more than two queues, the arrival order counter may be set to count to a value representing 2 times the sum of the depths of all the queues and order controller 112 may include additional logic for selecting which next activity entry is the oldest from among each pairing of the queues. In addition, in other examples, multiple arrival order counters may be implemented or a single arrival order counter may be implemented to set order counter values across more than two queues.

FIG. 2 illustrates a block diagram of one example of components of an order controller for a multiple queue interface for handling selection of an available queue for arriving events and tracking the relative arrival order of events placed in one of the multiple queues.

In the example, order controller 112 includes, for handling an incoming event stream, an N entry queue counter 204 set to count N entries and an M entry queue counter 206, set to count M entries, where order controller 112 uses N entry queue counter 204 to count the number of active entries in queue 106 and uses M entry queue counter 206 to count the number of active entries in queue 108.

In the example, order controller 112 includes, for handling an incoming event stream, an arrival order counter 202. In one example, arrival order counter 202 is set to count to a value equal to "2(N+M)−1", where N is the number of entries in queue 106 and M is the number of entries in queue 108. When the count in arrival order counter 202 overflows, arrival order counter 202 wraps back to zero. In the example, arrival order counter 202 may be set to count to alternate values.

In the example, a receiving interface controller 210 handles incoming events in event stream 102. In one example, receiving interface controller 210 handles incoming events in event stream 102 through a classification detector 212 that identifies a particular classification for each event and selects the queue associated with the particular classification. In one example, a queue status detector 214 detects whether the entry queue counter for the selected queue, from among N entry queue counter 204 and M entry queue counter 206, indicates the selected queue is full. In the example, if queue status detector 214 detects that the selected queue is full, a full queue handler 216 rejects the incoming event. In one example, queue status detector 214 efficiently detects whether an incoming entry can be added to a selected queue or not by checking whether the counter value in the entry queue counter for the selected queue is set to a value indicating all the entries are active and the queue is full. As order controller 112 selects queue entries for processing by processing interface 114, order controller 112 reduces the count in the entry queue counter associated with the queue from which the entry is processed so that the value in each of N entry queue counter 204 and M entry queue counter 206 reflects the current number of active entries in each queue.

In the example, if queue status detector 214 detects that the selected queue is not full, an open queue handler 218 controls adding the incoming event as an entry to the selected queue from among queue 106 and queue 108 with an order counter value for the entry set to the current counter value set in arrival order counter 202, sets a status bit for the entry to "active", increments arrival order counter 202, and increments the entry queue counter for the selected queue from among N entry queue counter 204 and M entry queue counter 206. In the example, by setting arrival order counter 202 to count up to "2(N+M)" and by storing each event entry with an order counter value set to the current arrival order counter value in arrival order counter 202, the order counter value stored with each event entry in each queue allows order controller 112 to efficiently track the relative arrival order of each entry in each of queue 106 and queue 108 even when arrival order counter 202 overflows and wraps back to zero.

FIG. 3 illustrates one example of values stored with each queue entry, including an order counter value and a status bit. In the example, as illustrated at reference numeral 302, each queue entry in queue 106 and queue 108 may include, but is not limited to, an event register 304 for storing an event identifier 310, an order counter register 306 of same length as arrival order counter 202 for storing an order counter value 312, and a status bit register 308 for storing a status bit 314 of one-bit length. In the example, event identifier 310 may include one or more attributes such as a starting address of the event, a size of the transaction, and a byte-enable setting. In the example, order counter value 312 may include the arrival order counter value at the time of arrival to indicate relative arrival order. In one example, the MSB of order counter value 312, which may also refer to the top bit of order counter value 312, may effectively represent an overflow bit available for a first step in determining the relative arrival order of an entry in comparison with another entry, with the other bits of order counter value 312 effectively representing the counter values available for a second step in determining the relative arrival order of the entry in comparison with another entry. In one example, where order counter value 312 is N bits long, the [0] bit may refer to the top bit and the [1:N] bits may refer to the other bits. In the example, status bit 314 may include a status bit set in a status bit register to indicate whether the event is pending, or "active", or has been processed, or is "done". In additional or alternate examples, each queue entry, as illustrated at reference numeral 302, may include additional or alternate data.

FIG. 4 illustrates a block diagram of one example of components of an order controller for a multiple queue interface for handling event selection of events placed in one of multiple queues to be processed from the queues in order of arrival.

In the example, order controller 112 manages a separate front pointer for each of queue 106 and queue 108. In the example, a front pointer 402 points to entries in queue 106 and a front pointer 404 points to entries in queue 108. Front pointer 402 and front point 404 are initially set to zero and point to the next entry to be handled in each queue. When an entry is released from one of queue 106 and queue 108 to processing interface 114, the front pointer for the queue is incremented one position, to point to the next entry to be handled. In the example, if either of front pointer 402 or front pointer 404 points to an entry and the status bit for the entry is set to "done", then there are no entries left in the queue to be handled.

In the example, order controller 112 may include a processing interface controller 404 for handling selection of the next event to process from among the events in queue 106 and queue 108. In the example, as illustrated at reference numeral 406, processing interface controller 404 triggers a queue processing selector 408 to determine the next event to process. In the example, as illustrated at reference numeral 406, once queue processing selector 408 selects an event to be processed, processing interface controller 404 releases the selected event to be processed, sets the status bit for the entry for the selected event to "done", increments the front pointer for the selected event queue from among front pointer 402 and front pointer 404, and decrements the selected event entry queue counter from among N entry queue counter 204 and M entry queue counter 206.

In the example, queue processing selector 408 may include an available entry detector 412. Available entry detector 412 examines the status bit assigned to the entry pointed to by each of front pointer 402 and front pointer 404. As illustrated at reference numeral 414, if both front pointer 402 and front pointer 404 point to entries with each with a status bit set to "done", then no entry is selected for processing. As illustrated at reference numeral 416, if only one of front pointer 402 and front pointer 404 point to an entry with a status bit set to "active", then the entry pointed to with the status bit set to "active" is selected for processing. As illustrated at reference numeral 418, if both front pointer 402 and front pointer 404 each point to an entry with a status bit set to "active", then an exclusive OR calculator 420 is triggered. Exclusive OR calculator 420 represents logic for performing an exclusive OR operation (XOR) of the MSB of the first N entry queue, front pointer entry, order counter value and MSB of the second M entry queue, front pointer entry, order counter value, as illustrated at reference numeral 422. In the example, an exclusive OR value is true or "1" if the MSB of the N entry queue order counter value is not the same as the MSB of the M entry queue order counter value and is false or "0" if the MSB of the N entry queue order counter value is the same as the MSB of the M entry queue order counter value.

In the example, an exclusive OR comparator 430 represents logic for comparing the exclusive OR value calculated by exclusive OR calculator 420 with a comparator bit setting. In one example, as illustrated at reference numeral 432, if the XOR value="0", then the front pointer entry with the smaller order counter value is selected. As illustrated at reference numeral 434, if the XOR value="1", then the front pointer entry with the larger order counter value is selected. In particular, in determining which order counter value is smaller or larger, in one example, exclusive OR comparator 430 may first compare the [1:N] bits of each order counter value and set the comparator bit to "1" if the first queue front pointer entry [1:N] bits are larger than the second queue front pointer entry [1:N] bits and to "0" if the first queue front pointer entry [1:N] bits are smaller than the second queue front pointer entry [1:N] bits. Exclusive OR comparator 430 may then implement exclusive-not-OR (XNOR) logic to select the oldest counter value, where if the XNOR computation of the XOR value and the comparator bit is a logical "1", then the first queue order counter value is older and if the XNOR computation of the XOR value and the comparator bit is a logical "0", then the second queue order counter value is older.

In the example, the XOR gate required for performing the XOR operation of exclusive OR calculator 420 on the MSB counter bits for each pair of queues requires a minimal amount of logic to determine whether the smaller or larger remainder value is older. In the example, the comparison gate required for performing the comparison operation of exclusive OR comparator 430 requires a minimal amount of logic to determine which event is older. In one example, exclusive OR comparator 430 may be implemented using a comparator and an XNOR gate. In an example where the number of queues implemented is greater than two queues, in one example, an exclusive OR calculator may be implemented for each pairing of queues or for only a selection of pairings of queues, where by minimizing the logic required for determining whether a smaller or larger entry counter is older for each pairing of queues, the logic required for exclusive OR comparator 430 to determine which entry counter is the oldest from among all the queues, is also minimized.

FIGS. 5A, 5B, 5C and 5D illustrate a block diagram of one example of an order controller tracking a relative arrival order of events being stored in multiple queues when a counter value from a counter is stored with each arriving event to indicate arrival order and the counter is incremented with each arriving event, where the counter wraps back to zero on overflow.

In the example, an event stream is illustrated for two queues, where N is set to a depth of 2 entries and M is set to a depth of 2 entries, as illustrated at reference numeral 500. In the example, as illustrated at reference numeral 502, an arrival order counter set to count [0:2] is set representing a 2(N+M) counter, a first queue (Q1) front pointer, a Q1 entry queue counter, a second queue (Q2) front pointer, and a Q2 entry queue counter are all initially set to "0". In the example, as illustrated in a queue status 504, the front pointer of each of Q1 and Q2 initially points to the entry set to "0", which is the first entry in each queue, the order counter value for each entry in each of Q1 and Q2 is set to "0" and the status bit for each entry in each of Q1 and Q2 is set to "0", which is the "done" status bit setting.

In the example, Q1 is designated for storing events classified as "read" events and Q2 is designated for storing events classified as "write" events. In the example, as illustrated in a sequence 506 and a queue status 508, an event A arrives, which is classified as a read event and placed in the first open queue entry of Q1, with the Q1 entry queue counter incremented to "1", an event A order counter value set to the current arrival order counter value of "000", and an event A status bit set to "1". The arrival order counter is incremented to "001". Next, as illustrated in sequence 506 and queue status 508, an event B arrives, which is classified as a read event and placed in the next open queue entry of Q1, with the Q1 entry queue counter incremented to "2", an event B order counter value set to the current arrival order counter value of "001", and an event B status bit set to "1". The arrival order counter is incremented to "010". Next, as illustrated in sequence 506 and queue status 508, and an event C arrives, which is classified as a write event and placed in the next open queue entry of Q2, with the Q2 entry queue counter incremented to "1", an event C order counter value set to the current arrival order counter value of "010", and an event C status bit set to "1". The arrival order counter is incremented to "011". Next, as illustrated in sequence 506 and queue status 508, an event D arrives, which is classified as a write event and placed in the next open queue entry of Q2, with the Q2 entry queue counter incremented to "2", an event D order counter value set to the current arrival order counter value of "011", and an event D status bit set to "1". The arrival order counter is incremented to "100".

In the example, as illustrated in a sequence 510, from among event A pointed to by the Q1 front pointer and event C pointed to by the Q2 front pointer, both with status bits set to "active", event A is selected to be processed. In particular, in the example, an XOR operation is performed on the [0] bit, or top bit, of the event A counter, which is "0", with the [0] bit of the event C counter, which is "0". The XOR value resulting from the operation is a "0". In the example, when the XOR value is "0", then the event with the smaller value in the remainder bits of the counter, or [1:2] bits of the counter, is selected. In the example, the event A remainder bits counter value is "00", which is smaller than the event C remainder bits counter value of "10". As illustrated in sequence 510 and a queue status 512, the event A entry status bit is set to "0", the Q1 entry queue counter is decremented to "1", and the Q1 front pointer is incremented to "1" and points to the entry for event C. Next, as illustrated in sequence 510 and queue status 512, event E arrives, which is classified as a read event and placed in the first open entry in Q1, with the Q1 entry queue counter incremented to "2", the event E order counter value set to the current arrival order counter value of "100", and an event E status bit set to "1". Next, as illustrated in sequence 510, the arrival order counter is incremented to "101".

In the example, as illustrated in a sequence 514, from among event B pointed to by the Q1 front pointer and event C pointed to by the Q2 front pointer, both with status bits set to "1", event B is selected to be processed. In particular, in the example, an XOR operation is performed on the [0] bit of the event B counter, which is "0", with the [0] bit of the event C counter, which is "0". The XOR value resulting from the operation is a "0". In the example, when the XOR value is "0", then the event with the smaller value in the remainder bits of the counter, or [1:2] bits of the counter, is selected. In the example, the event B remainder bits counter value is "01", which is smaller than the event C remainder bits counter value of "10". As illustrated in sequence 514 and a queue status 516, the event B status bit is set to "0", the Q1 entry queue counter is decremented to "1", and the Q1 front pointer is incremented to overflow to "0" and points to the entry for event E.

In the example, as illustrated in a sequence 518, from among event E pointed to by the Q1 front pointer and event C pointed to by the Q2 front pointer, both with status bits set to "1", event C is selected to be processed. In particular, in the example, an XOR operation is performed on the [0] bit of the event E counter, which is "1", with the [0] bit of the event C counter, which is "0". The XOR value resulting from the operation is a "1". In the example, when the XOR value is "1", then the event with the larger value in the remainder bits of the counter, or [1:2] bits of the counter, is selected. In the example, the event C remainder bits counter value is "10", which is larger than the event E remainder bits counter value of "00". As illustrated in sequence 518 and a queue status 520, the event C status bit is set to "0", the Q2 entry queue counter is decremented to "1", and the Q2 front pointer is incremented to "1", pointing to the entry for event D. Next, as illustrated in sequence 518 and queue status 520, event F arrives, which is classified as a write event and placed in the first open entry in Q2, with the Q2 entry queue counter incremented back to "2", the event F order counter value set to the current arrival order counter value of "101", and an event F status bit set to "1". Next, as illustrated in sequence 518, the arrival order counter is incremented to "110".

In the example, as illustrated in a sequence 522, from among event E pointed to by the Q1 front pointer and event D pointed to by the Q2 front pointer, both with status bits set to "1", event D is selected to be processed. In particular, in the example, an XOR operation is performed on the [0] bit of the event E counter, which is "1", with the [0] bit of the event D counter, which is "0". The XOR value resulting from the operation is a "1". In the example, when the XOR value is "1", then the event with the larger value in the remainder bits of the counter, or [1:2] bits of the counter, is selected. In the example, the event D remainder bits counter value is "11", which is larger than the event E remainder bits counter value of "00". As illustrated in sequence 522 and a queue status 524, the Q2 entry queue counter is decremented to "1", the Q2 front pointer is incremented and overflows to "0", pointing to the entry for event F. Next, as illustrated in sequence 522 and queue status 524, event G arrives, which is classified as a read event and placed in the first open entry in Q1, with the Q1 entry queue counter incremented back to "2", the event G order counter value set to the current arrival order counter value of "110", and an event G status bit set to "1". Next, as illustrated in sequence 522, the arrival order counter is incremented to "111".

In the example, as illustrated in a sequence 526, from among event E pointed to by the Q1 front pointer and event F pointed to by the Q2 front pointer, both with status bits set to "1", event E is selected to be processed. In particular, in the example, an XOR operation is performed on the [0] bit of the event E counter, which is "1", with the [0] bit of the event F counter, which is "1". The XOR value resulting from the operation is a "0". In the example, when the XOR value is "0", then the event with the smaller value in the remainder bits of the counter, or [1:2] bits of the counter, is selected. In the example, the event E remainder bits counter value is "00", which is smaller than the event F remainder bits counter value of "01". As illustrated in sequence 526 and a queue status 528, the Q1 entry queue counter is decremented to "1", and the Q1 front pointer is incremented to "1", pointing to the entry for event G. Next, as illustrated in sequence 526 and queue status 528, event H arrives, which is classified as a write event and placed in the first open entry in Q2, with the Q2 entry queue counter incremented back to "2", the event H order counter value set to the current arrival order counter value of "111", and an event H status bit set to "1". Next, as illustrated in sequence 526, the arrival order counter is incremented to "000".

In the example, as illustrated in a sequence 530, from among event G pointed to by the Q1 front pointer and event F pointed to by the Q2 front pointer, both with status bits set to "1", event F is selected to be processed. In particular, in the example, an XOR operation is performed on the [0] bit of the event G counter, which is "1", with the [0] bit of the event F counter, which is "1". The XOR value resulting from the operation is a "0". In the example, when the XOR value is "0", then the event with the smaller value in the remainder bits of the counter, or [1:2] bits of the counter, is selected. In the example, the event F remainder bits counter value is "01", which is smaller than the event G remainder bits counter value of "10". As illustrated in sequence 530 and a queue status 532, the event F status bit is set to "0", the Q2 entry queue counter is decremented to "1", and the Q2 front pointer is incremented to "1", pointing to the entry for event H.

In the example, as illustrated in a sequence 534, from among event G pointed to by the Q1 front pointer and event H pointed to by the Q2 front pointer, both with status bits set to "1", event G is selected to be processed. In particular, in the example, an XOR operation is performed on the [0] bit of the event G counter, which is "1", with the [0] bit of the event H counter, which is "1". The XOR value resulting from the operation is a "0". In the example, when the XOR value is "0", then the event with the smaller value in the remainder bits of the counter, or [1:2] bits of the counter, is selected. In the example, the event G remainder bits counter value is "10", which is smaller than the event H remainder bits counter value of "11". As illustrated in sequence 534 and a queue status 536, the event G status bit is set to "0", the Q1 entry queue counter is decremented to "0", and the Q1 front pointer is incremented and overflows to "0". Next, as illustrated in sequence 534 and queue status 536, event I arrives, which is classified as a read event and placed in the first open entry in Q1, with the Q1 entry queue counter incremented back to "1", the event I order counter value set to the current arrival order counter value of "000", and an event I status bit set to "1". Next, as illustrated in sequence 534, the arrival order counter is incremented to "001".

In the example, as illustrated in a sequence 538, from among event I pointed to by the Q1 front pointer and event H pointed to by the Q2 front pointer, both with status bits set to "1", event H is selected to be processed. In particular, in the example, an XOR operation is performed on the [0] bit of the event I counter, which is "0", with the [0] bit of the event H counter, which is "1". The XOR value resulting from the operation is a "1". In the example, when the XOR value is "1", then the event with the larger value in the remainder bits of the counter, or [1:2] bits of the counter, is selected. In the example, the event H remainder bits counter value is "11", which is larger than the event I remainder bits counter value of "00". As illustrated in sequence 538 and a queue status 540, the event H status bit is set to "0", the Q2 entry queue counter is decremented to "0", and the Q2 front pointer is incremented and overflows to "0", pointing to event F, which already has a status bit set to "done".

In the example, as illustrated in a sequence 542 and a queue status 544, event I is selected to be processed. In particular, in the example, event I is the only entry with a front pointer set to a status bit set to "active", therefore event I is selected to be processed, the status bit for event I is set to "0", the Q1 entry queue counter is decremented to "0", and the Q1 front pointer is incremented to "1". As illustrated in queue status 542, both the Q1 front pointer and the Q2 front pointer both point to entries with a status of "0", therefore there are no entries remaining to be processed in Q1 and Q2.

Figure 6:
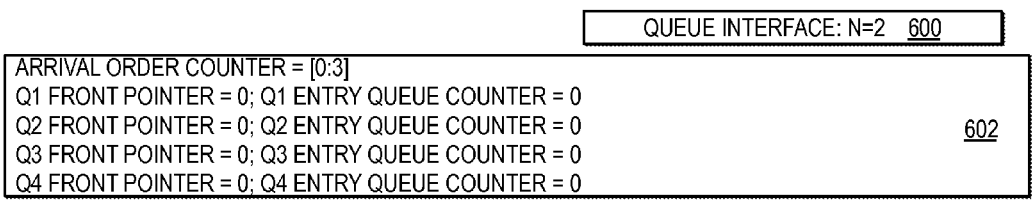
FIG. 6 illustrates one example of a block diagram of one example of an order controller tracking a relative arrival order of events being stored in more than two queues.

FIG. 6 illustrates a block diagram of one example of an order controller for tracking a relative arrival order of events being stored in more than two queues. In the example, an event stream is illustrated for four queues, where each queue is set to a depth of 2 entries, as illustrated at reference numeral 600.

In the example, as illustrated at reference numeral 602, the infrastructure for the four queues includes an arrival order counter set to count 2*(number of queues)*(N), which is 2*(4)*2=16. In the example, in order to count 16 bits, the arrival order counter is set to count [0:3] bits. In the example illustrated at reference numeral 602, each queue from among a Q1 604, a Q2 606, a Q3 608, and a Q4 610, includes a front pointer for counting which entry is currently the front of each queue and an entry queue counter for counting a current number of active entries in each queue. In additional embodiments, additional or alternate pointers or counters may be implemented to track the current entry in each queue. In the example, each of Q1 604, Q2 606, Q3 608, and Q4 610 track an event identifier and a counter value stored for each event. In addition, although not depicted, each entry in each queue may include a status bit indicating whether an entry is active or done.

In the example, each of Q1 604, Q2 606, Q3 608, and Q4 610 are set to a depth of "2" entries, however, for purposes of illustration, an example of a history of entries which may be entered in a queue, over time, is illustrated. In particular, in the example, a first event A arrives and is placed in Q1 604, with a counter value set to the arrival order counter value of "0000". In the example, a next event A arrives and is placed in Q2 606, with a counter value set to the arrival order counter value of "0001". In the example, a next event C arrives and is placed in Q3 608, with a counter value set to the arrival order counter value of "0010". In the example, a next event D arrives and is also placed in Q3 608, with a counter value set to the arrival order counter value of "0011". In the example, a next event E arrives and is placed in Q4 610, with a counter value set to the arrival order counter value of "0100". In the example, a next event F arrives and is placed in Q2 606, with a counter value set to the arrival order counter value of "0101". In the example, a next event G arrives and is placed in Q1 604, with a counter value set to the arrival order counter value of "0110". In the example, a next event H arrives and is placed in Q4 610, with a counter value set to the arrival order counter value of "0111". In the example, a next event I arrives and is placed in Q3 608, with a counter value set to the arrival order counter value of "1000". In the example, a next event J arrives and is placed in Q4 610, with a counter value set to the arrival order counter value of "1001". In the example, a next event K arrives and is placed in Q4 610, with a counter value set to the arrival order counter value of "1010". In the example, a next event L arrives and is placed in Q2 606, with a counter value set to the arrival order counter value of "1011". In the example, a next event M arrives and is placed in Q2 608, with a counter value set to the arrival order counter value of "1100". In the example, a next event N arrives and is placed in Q1 604, with a counter value set to the arrival order counter value of "1101". In the example, a next event O arrives and is placed in Q1 604, with a counter value set to the arrival order counter value of "1110". In the example, a next event P arrives and is placed in Q4 610, with a counter value set to the arrival order counter value of "1111". In the example, a next event Q arrives and is placed in Q1 604, with a counter value set to the arrival order counter value of "0000". In the example, a next event R arrives and is placed in Q2 606, with a counter value set to the arrival order counter value of "0001". In the example, a next event S arrives and is placed in Q3 608, with a counter value set to the arrival order counter value of "0010". In the example, a next event T arrives and is placed in Q1 604, with a counter value set to the arrival order counter value of "0011". In the example, a next event U arrives and is placed in Q2 606, with a counter value set to the arrival order counter value of "0100". In the example, a next event V arrives and is placed in Q3 608, with a counter value set to the arrival order counter value of "0101". In the example, a next event W arrives and is placed in Q3 608, with a counter value set to the arrival order counter value of "0110". In the example, a next event X arrives and is placed in Q4 610, with a counter value set to the arrival order counter value of "0111". In the example, a next event Y arrives and is placed in Q2 606, with a counter value set to the arrival order counter value of "1000". In the example, a next event Z arrives and is placed in Q1 604, with a counter value set to the arrival order counter value of "1001". In the example, a next event a arrives and is placed in Q2 606, with a counter value set to the arrival order counter value of "1010". In the example, a next event b arrives and is placed in Q4 610, with a counter value set to the arrival order counter value of "1011".

In the example, as illustrated, by tracking a four bit counter value for each entry, to indicate the relative arrival order of each entry in four different queues, a separate exclusive OR operation may be performed on the top bit, or counter[0] of a selection of pairs of queues, to determine whether to select the smaller or larger value in the remainder of the counter bits, or counter [1:3], as the oldest for each of the selection of pairs of queues. Next, the oldest of each of the selection of pairs of queues is filtered to determine the oldest entry from among the four queues. In one example, the selection of pairs of queues may include Q1 604 with Q2

606, Q1 604 with Q3 608, Q1 604 with Q4 610, Q2 606 with Q3 608, Q2 606 with Q4 610, and Q3 608 with Q4 610, where if the first queue in each pair is oldest, a bit is set, and the selection of set oldest bits from the pairs are used to determine which queue has the oldest entry. In other examples, other selections of pairs of queues may be implemented.

Figure 7A:
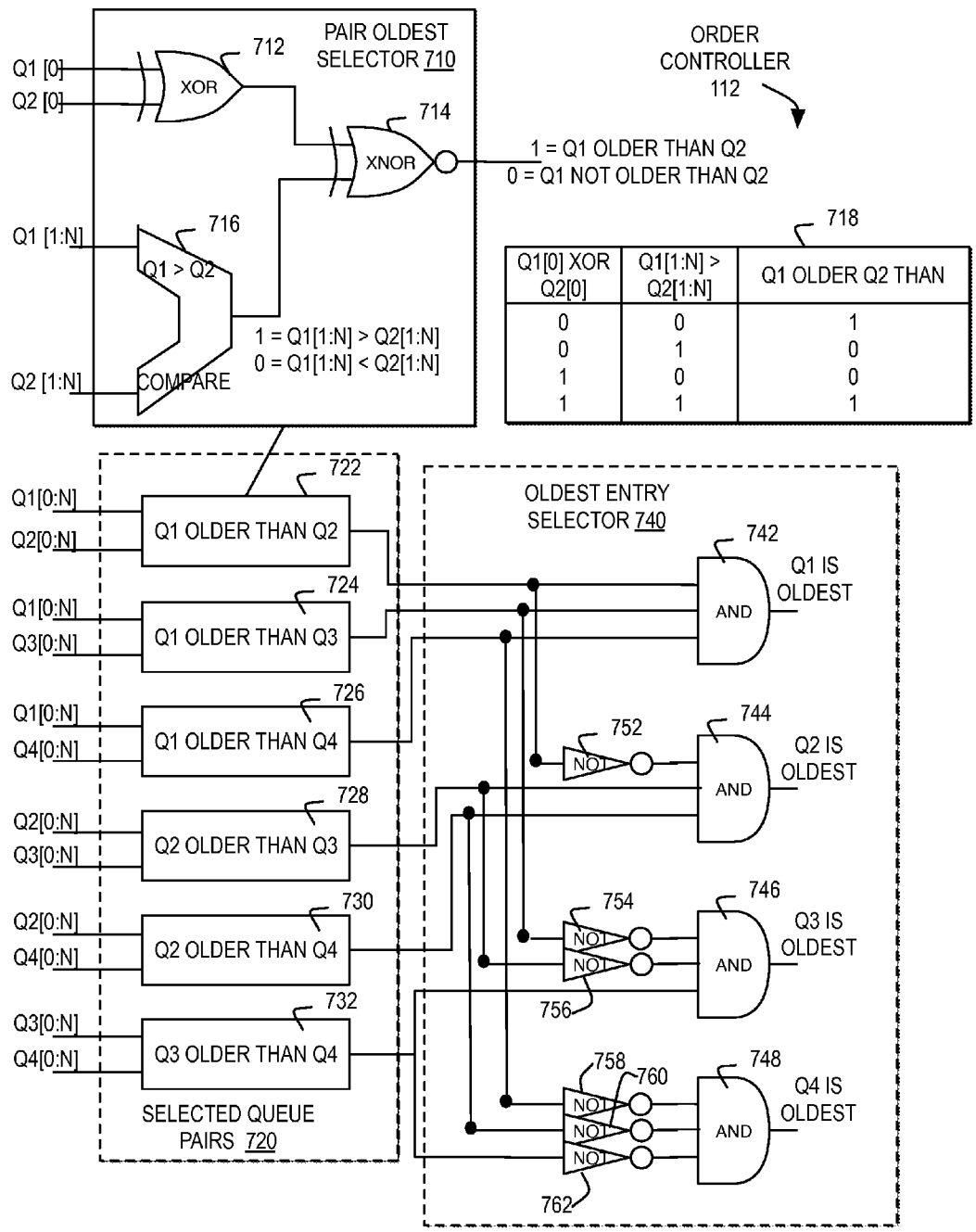
FIGS. 7A-7B illustrate one example of a block diagram of an order controller for selecting an oldest event from among more than two queues, the relative arrival order of events being stored in more than two queues is tracked.
Figure 7B:
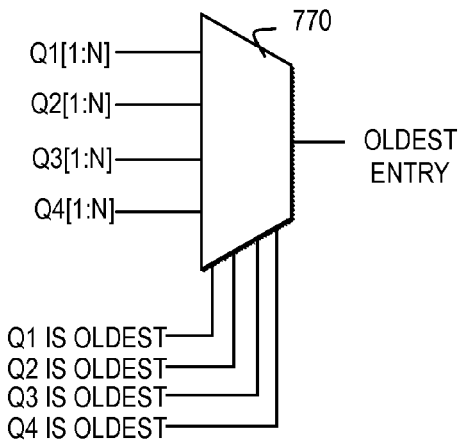

FIGS. 7A-7B illustrate a block diagram of one example of an order controller for selecting an oldest event from among more than two queues, the relative arrival order of events being stored in more than two queues is tracked.

In one example, for the four queues illustrated in FIG. 6 as Q1 604, Q2 606, Q3 608, and Q4 610, order controller 112 includes a separate selector, such as pair oldest selector 710, specified for each queue pair in selection of queue pairs 720. In one example, the selection of queue pairs 720 includes a selector 722 for selecting whether Q1 is older than Q2, a selector 724 for selecting whether Q1 is older than Q3, a selector 726 for selecting whether Q1 is older than Q4, a selector 728 for selecting whether Q2 is older than Q3, a selector 730 for selecting whether Q2 is older than Q4, and a selector 732 for selecting whether Q3 is older than Q4.

In one example, one or more logical components of exclusive OR calculator 420 and exclusive OR comparator 430 may be embodied in pair oldest selector 710, for each selection of queue pairs. In one example, pair oldest selector 710, when applied as selector 722, may include inputs of Q1 counter [0:N] and Q2 counter [0:N] and output a logical "1" if Q1 is older than Q2 or a logical "0" if Q1 is not older than Q2. In one example, exclusive OR calculator 420 may be implemented through an XOR gate 712 that performs an XOR operation on Q1 counter [0] and Q2 counter [0]. In one example, XOR gate 712 outputs a logical "0" if Q1 counter [0] and Q2 counter [0] are the same value and outputs a logical "1" if Q1 counter [0] and Q2 counter [0] are different values. In one example, exclusive OR comparator 430 may be implemented through a comparator 716, which compares Q1 counter [1:N] and Q2 counter [1:N] and outputs a logical "1" if Q1[1:N] is larger than Q2[1:N] or a logical "0" if Q1[1:N] is smaller than Q2[1:N]. In addition, exclusive OR comparator 430 may be implemented through an XNOR gate 714 that performs an XNOR operation the output of XOR gate 712 and the output of comparator 716. In one example, XNOR gate 714 outputs a logical "0" if the output of XOR gate 712 and the output of comparator 716 are different and outputs a logical "1" if the output of XOR gate 712 and the output of comparator 716 are the same. In one example, XNOR gate 714 outputs a logical "1" if Q1 is older than Q2 and outputs a logical "0" if Q1 is not older than Q2.

In one example, a table 718 illustrates the expected output from XNOR gate 714 for a combination of outputs from XOR gate 712 and comparator 716. In the example, if the output from XOR gate 712 is a logical "0" and the output from comparator 716 is a logical "0", the output from XNOR gate 714 is a logical "1", indicating that Q1 is not older than Q2. In the example, if the output from XOR gate 712 is a logical "0" and the output from comparator 716 is a logical "1", the output from XNOR gate 714 is a logical "0", indicating that Q1 is older than Q2. In the example, if the output from XOR gate 712 is a logical "1" and the output from comparator 716 is a logical "0", the output from XNOR gate 714 is a logical "0", indicating that Q1 is older than Q2. In the example, if the output from XOR gate 712 is a logical "1" and the output from comparator 716 is a logical "1", the output from XNOR gate 714 is a logical "1", indicating that Q1 is not older than Q2.

In the example, order controller 112 includes oldest entry selector 740 for comparing the outputs from the selectors in selected queue pairs 720 and selecting the oldest queue entry. In one example, oldest entry selector 740 includes an AND gate for each of the queues, where AND gate 742 is specified for Q1, AND gate 744 is specified for Q2, AND gate 746 is specified for Q3, and AND gate 748 is specified for Q4. In the example, each of AND gate 742, AND gate 744, AND gate 746, and AND gate 748 receives inputs of a separate combination of selector outputs from selected queue pairs 720. In one example, each of AND gate 742, AND gate 744, AND gate 746, and AND gate 748 output a logical "1" if all of the inputs to the AND gate are a logical "1" and output a logical "0" if not all of the inputs to the AND gate are a logical "1". Only one of AND gate 742, AND gate 744, AND gate 746, and AND gate 748 is set to a logical "1" for each comparison. The queue associated with the logical AND gate set to a logical "1" is the oldest entry.

In one example, AND gate 742 receives an input from selector 722, which is a logical "1" if Q1 is older than Q2, an input from selector 724, which is a logical "1" if Q1 is older than Q3, and an input from selector 726, which is a logical "1" if Q1 is older than Q4. In the example, the output from AND gate 742 is a logical "1" if Q1 is older than Q2, Q3, and Q4, which occurs if all of the signals output from selector 722, selector 724, and selector 726 are a logical "1".

In one example, AND gate 744 receives an input from selector 722 inverted by a NOT gate 752, which is a logical "1" if Q1 is not older than Q2, an input from selector 728, which is a logical "1" if Q2 is older than Q3, and an input from selector 730, which is a logical "1" if Q2 is older than Q4. In the example, the output from AND gate 744 is a logical "1" if Q2 is older than Q1, Q3, and Q4, which occurs if the signal output from selector 722 is a logical "0", which is then inverted by NOT gate 752, and the signals output from selector 724 and selector 726 are a logical "1".

In one example, AND gate 746 receives an input from selector 724 inverted by a NOT gate 754, which is a logical "1" if Q1 is not older than Q3, an input from selector 728 inverted by a NOT gate 756, which is a logical "1" if Q2 is not older than Q3, and an input from selector 732, which is a logical "1" if Q3 is older than Q4. In the example, the output from AND gate 746 is a logical "1" if Q3 is older than Q1, Q2, and Q4, which occurs if the signal output from selector 724 is a logical "0", which is then inverted by NOT gate 754, the signal output from selector 728 is a logical "0", which is then inverted by NOT gate 756, and the signal output from selector 732 is a logical "1".

In one example, AND gate 748 receives an input from selector 726 inverted by a NOT gate 758, which is a logical "1" if Q1 is not older than Q4, an input from selector 730 inverted by a NOT gate 760, which is a logical "1" if Q2 is not older than Q4, and an input from selector 732 inverted by a NOT gate 762, which is a logical "1" if Q3 is not older than Q4. In the example, the output from AND gate 748 is a logical "1" if Q4 is older than Q1, Q2, and Q3, which occurs if the signal output from selector 726 is a logical "0", which is then inverted by NOT gate 758, the signal output from selector 730 is a logical "0", which is then inverted by NOT gate 760, and the signal output from selector 732 is a logical "0", which is then inverted by NOT gate 726.

In the example, while oldest entry selector 742 is illustrated as included multiple AND gates for selecting an oldest queue based on combinations of inputs from selections of selected queue pairs 720, in additional or alternate embodiments, other types of logic may be implemented to select an oldest entry based on the outputs from selected queue pairs 720. In one example, oldest entry selector 742 may include a comparator with a table of selection patterns each associated with a particular queue, where the outputs of selected queue pairs 720 are compared with the entries in the table of selection patterns to identify a matching selection pattern and identify the oldest entry as the entry from the particular queue associated with the matching selection pattern.

In one example, a multiplexor 770 or other selection logic may be implemented to receive the outputs of the AND gates of oldest entry selector 740 as inputs for selecting an oldest entry. In one example, multiplexor 770 receives inputs of the [1:N] bits of the counters for each of Q1, Q2, Q3, and Q4 and selects which of the inputs to output as the oldest entry based on the signals output by the AND gates of oldest entry selector 740 indicating which queue has the oldest entry. In the example, if the "Q1 is oldest" signal output by AND gate 742 is a logical "1", then multiplexor 770 outputs Q1[1:N] as the oldest entry. In the example, if the "Q2 is oldest" signal output by AND gate 744 is a logical "1", then multiplexor 770 outputs Q2[1:N] as the oldest entry. In the example, if the "Q3 is oldest" signal output by AND gate 746 is a logical "1", then multiplexor 770 outputs Q3[1:N] as the oldest entry. In the example, if the "Q4 is oldest" signal output by AND gate 748 is a logical "1", then multiplexor 770 outputs Q4[1:N] as the oldest entry.

In one example illustrated in FIGS. 7A-7B, order controller 112 determines the oldest event from among the first entries pointed to within Q1 604, Q2 606, Q3 608, and Q4 610, which are labeled as event A, event B, event C, and event E.

In the example for event A, event B, event C and event E, selector 722 performs an XOR operation on counter [0] for event A of "0" with counter [0] for event B of "0", yielding an XOR value of a logical "0", performs a comparison of counter [1:3] for event A of "000" with counter [1:3] for event B of "001", yielding a logical "0" because "000" is smaller than "001", and performs an XNOR operation on the XOR output of logical "0" and the comparator output of logical "0", yielding a logical "1", indicating that event A is older than event B.

In addition, in the example for event A, event B, event C and event E, selector 724 performs an XOR operation on counter [0] for event A of "0" with counter [0] for event C of "0", yielding an XOR value of a logical "0", performs a comparison of counter [1:3] for event A of "000" with counter [1:3] for event C of "010", yielding a logical "0" because "000" is smaller than "010", and performs an XNOR operation on the XOR output of logical "0" and the comparator output of logical "0", yielding a logical "1", indicating that event A is older than event C.

In addition, in the example for event A, event B, event C and event E, selector 726 performs an XOR operation on counter [0] for event A of "0" with counter [0] for event E of "0", yielding an XOR value of a logical "0", performs a comparison of counter [1:3] for event A of "000" with counter [1:3] for event E of "100", yielding a logical "0" because "000" is smaller than "100", and performs an XNOR operation on the XOR output of logical "0" and the comparator output of logical "0", yielding a logical "1", indicating that event A is older than event E.

In addition, in the example for event A, event B, event C and event E, selector 728 performs an XOR operation on counter [0] for event B of "0" with counter [0] of event C of "0", yielding an XOR value of a logical "0", performs a comparison of counter [1:3] for event B of "001" with counter [1:3] for event C of "010", yielding a logical "0" because "001" is smaller than "010", and performs an XNOR operation on the XOR output of logical "0" and the comparator output of logical "0", yielding a logical "1", indicating that event B is older than event C.

In addition, in the example for event A, event B, event C and event E, selector 730 performs an XOR operation on counter [0] for event B of "0" with counter [0] of event E of "0", yielding an XOR value of a logical "0", performs a comparison of counter [1:3] for event B of "001" with counter [1:3] for event E of "100", yielding a logical "0" because "001" is smaller than "100", and performs an XNOR operation on the XOR output of logical "0" and the comparator output of logical "0", yielding a logical "1", indicating that event B is older than event E.

In addition, in the example for event A, event B, event C and event E, selector 732 performs an XOR operation on counter [0] for event C of "0" with counter [0] of event E of "0", yielding an XOR value of a logical "0", performs a comparison of counter [1:3] for event C of "010" with counter [1:3] for event E of "100", yielding a logical "0" because "010" is smaller than "100", and performs an XNOR operation on the XOR output of logical "0" and the comparator output of logical "0", yielding a logical "1", indicating that event C is older than event E.

In the example for event A, event B, event C and event E, AND gate 742 receives the outputs of selector 722, selector 724, and selector 726, which are all set to a logical "1". Because all the inputs to AND gate 742 are set to a logical "1", AND gate 742 is outputs a logical "1", indicating that Q1, which holds event A, is the oldest.

In the example for event A, event B, event C and event E, AND gate 744 receives the outputs of selector 722 inverted by NOT gate 752 and set to a logical "0", selector 728 set to a logical "1" and selector 730 set to a logical "1". Because not all the inputs to AND gate 744 are set to a logical "1", AND gate 744 outputs a logical "0", indicating that Q2, which holds event B, is not the oldest.

In the example for event A, event B, event C and event E, AND gate 746 receives the outputs of selector 724 inverted by NOT gate 754 and set to a logical "0", selector 728 inverted by NOT gate 756 and set to a logical "0", and selector 732 set to a logical "1". Because not all the inputs to AND gate 746 are set to a logical "1", AND gate 746 outputs a logical "0", indicating that Q3, which holds event C, is not the oldest.

In the example for event A, event B, event C and event E, AND gate 748 receives the outputs of selector 726 inverted by NOT gate 758 and set to a logical "0", selector 730 inverted by NOT gate 760 and set to a logical "0", and selector 732 inverted by NOT gate 762 and set to a logical "0". Because not all the inputs to AND gate 748 are set to a logical "1", AND gate 748 outputs a logical "0", indicating that Q4, which holds event E, is not the oldest.

Figure 8:
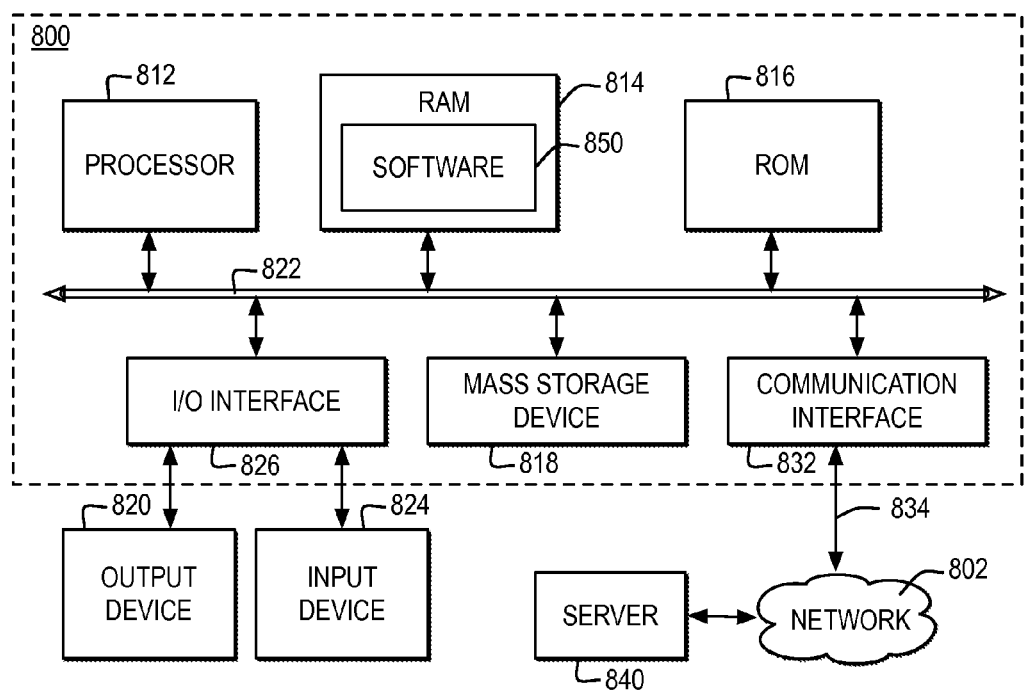
FIG. 8 illustrates a block diagram of one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowchart of FIGS. 10, 11, and 12*a*-12*b* and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts FIGS. 10, 11, and 12*a*-12*b*.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
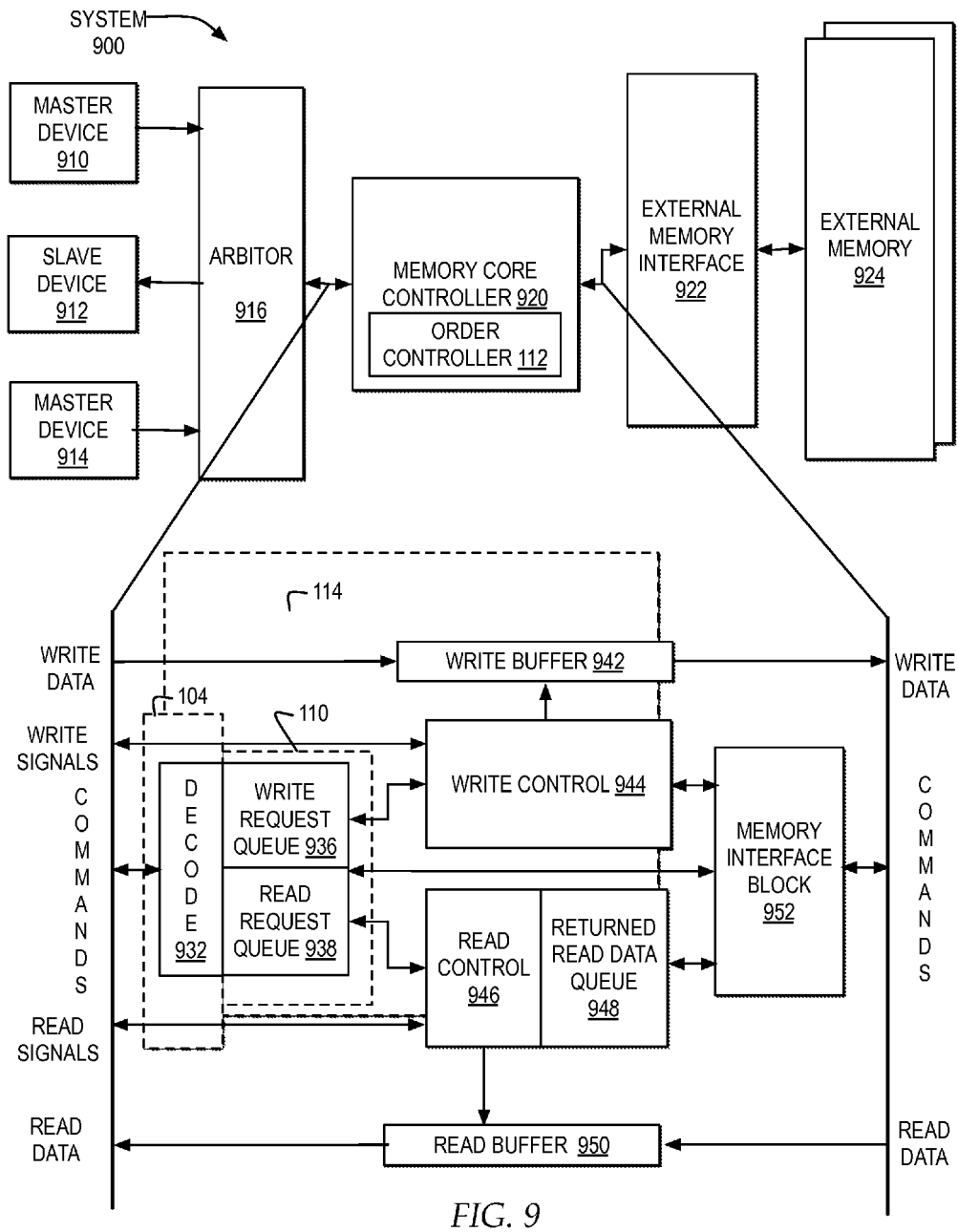
FIG. 9 illustrates a block diagram of one example of a memory core controller including a queue interface with multiple queues in which events are placed and in which the relative arrival order of events is tracked.

FIG. 9 is one example of a block diagram of a memory core controller including a queue interface with multiple queues in which events are placed and in which the relative arrival order of events is tracked.

In the example, a system 900 includes a memory core controller 920 that provides a mechanism to attach and interface one or more devices, such as a master device 910, a slave device 912, and a master device 914 to one or more external memory chips 924. In one example, master device 910, slave device 912, and master device 914 may include one or more of a processor local bus (PLB) master, PLB slave, a direct memory access (DMA) master, DMA slave, and an I/O master. In the example, an arbiter 916 interfaces with master device 910, slave device 912, and master device 914 and manages communications between each of the devices and memory core controller 920. In the example, the communications between each of the devices and memory core controller 920 may include write event requests, with a write command and write data, and read event requests, with a read command and read data. In the example, an external memory interface 922 interfaces between memory core controller 920 and one or more external memory chips 924. In one example, external memory interface 922 represents one or more double data rate (DDR), DDR2, and DDR3 synchronous dynamic random-access memory (SDRAM) interfaces and external memory chips 924 represents one or more DDR SDRAM, DDR2 SDRAM, and DDR3 SDRAM memories. External memory interface 922 may include drivers and receivers and may interface with a clock buffer between external memory interface 922 and external memory chips 924. In additional or alternate examples, external memory interface 922 may represent one or more interfaces for one or more additional or alternate types of memories and external memory 924 may represent one or more additional or alternate types of memories.

In the example, memory core controller 920 may provide a bridge between master device 910, slave device 912, and master device 914 and external memory chips 924 by managing read events requesting data from external memory 924 and write events requesting data be written to external memory 924. In one example, receiver interface 104 includes a decoder 932 for receiving commands from arbiter 916, identifying whether each command is a read command or a write command, and placing identified read commands in read request queue 938 and identified write commands in a write request queue 936, where queue interface 110 includes read request queue 938 and write request queue 936. In the example, processing interface 114 includes a write buffer 942 for buffering write data from arbiter 916, a read buffer 950 for buffering read data to be read by arbiter 916, a write control 944 for performing write control logic for arbiter 916, a read control 946 for performing read control logic for arbiter 916, a returned read data queue 948 for tracking returned read data from external memory interface 922, and a memory interface block 952 for interfacing with external memory interface 922.

In the example, memory core controller 920 includes order controller 112, as logic distributed throughout the components of memory core controller 920 for controlling the placement of commands received from arbiter 916 into read request queue 938 and write request queue 936 and for controlling the selection of commands to be processed next by external memory interface 922 from read request queue 938 and write request queue 938. In one example, the command to be processed next from read request queue and write request queue 938 is selected and passed to memory interface block 952 for processing by external memory interface 922.

Figures 10, 11:
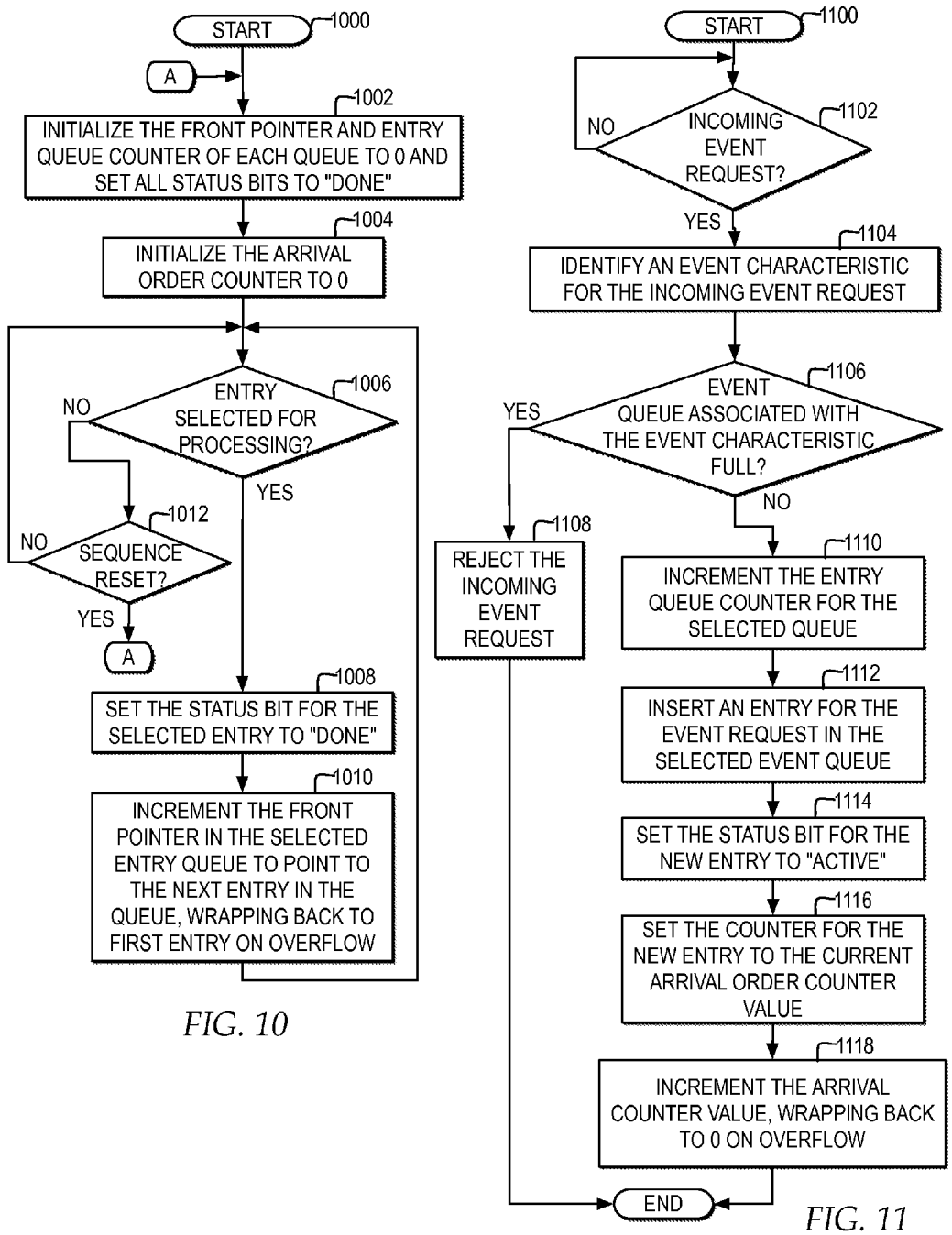
FIG. 10 illustrates a high level logic flowchart of a process and program for managing one or more counters and one or more pointers in a queue interface with multiple queues in which events are placed and in which the relative arrival order of events is tracked.
FIG. 11 illustrates a high level logic flowchart of a process and program for managing incoming event requests in a queue interface with multiple queues in which events are placed and in which the relative arrival order of events is tracked.

FIG. 10 illustrates a high level logic flowchart of a process and program for managing one or more counters and one or more pointers in a queue interface with multiple queues in which events are placed and in which the relative arrival order of events is tracked. In the example, the process starts at block 1000 and thereafter proceeds to block 1002. Block 1002 illustrates initializing the front pointer and entry queue counter of each queue to "0" and setting all status bits in the queues to "done". Next, block 1004 illustrates initializing the arrival order counter to "0". Thereafter, block 1006 illustrates a determination whether an entry from among the multiple queues is selected for processing. At block 1006, if no entry is selected for processing, the process passes to block 1012. Block 1012 illustrates a determination whether a sequence reset is selected. At block 1012, if a sequence reset is selected, then the process returns to block 1002 and the pointers and counters are reset. At block 1012, if a sequence reset is not selected, then the process returns to block 1006.

Returning to block 1006, at block 1006, if an entry is selected for processing, then the process passes to block 1008. Block 1008 illustrates setting the status bit for the selected entry to "done". Next, block 1010 illustrates incrementing the front pointer in the selected entry queue to point to the next entry in the queue, wrapping back to the first entry on overflow, and the process returns to block 1006.

FIG. 11 illustrates a high level logic flowchart of a process and program for managing incoming event requests in a queue interface with multiple queues in which events are placed and in which the relative arrival order of events is tracked. In the example, the process starts at block 1100 and thereafter proceeds to block 1102. Block 1102 illustrates a determination whether an incoming event request is detected. At block 1102, if an incoming event request is detected, then the process passes to block 1104. Block 1104 illustrates identifying an event characteristic for the incoming event request. Next, block 1106 illustrates a determination of whether the event queue associated with the event characteristic is full. At block 1106, if the event queue associated with the event characteristic is full, then the process passes to block 1108. Block 1108 illustrates rejecting the incoming event request, and the process ends.

Returning to block 1106, at block 1106, if the event queue associated with the event characteristic is not full, then the process passes to block 1110. Block 1110 illustrates incrementing the entry queue counter for the selected queue. Thereafter, block 1112 illustrates inserting an entry for the event request in the selected event queue. Next, block 1114 illustrates setting the status bit for the new entry to "active". Thereafter, block 1116 illustrates setting the counter for the new entry to the current arrival order counter value. Next, block 1118 illustrates incrementing the arrival order counter value, then wrapping back to 0 on overflow, and the process ends.

Figure 12A:
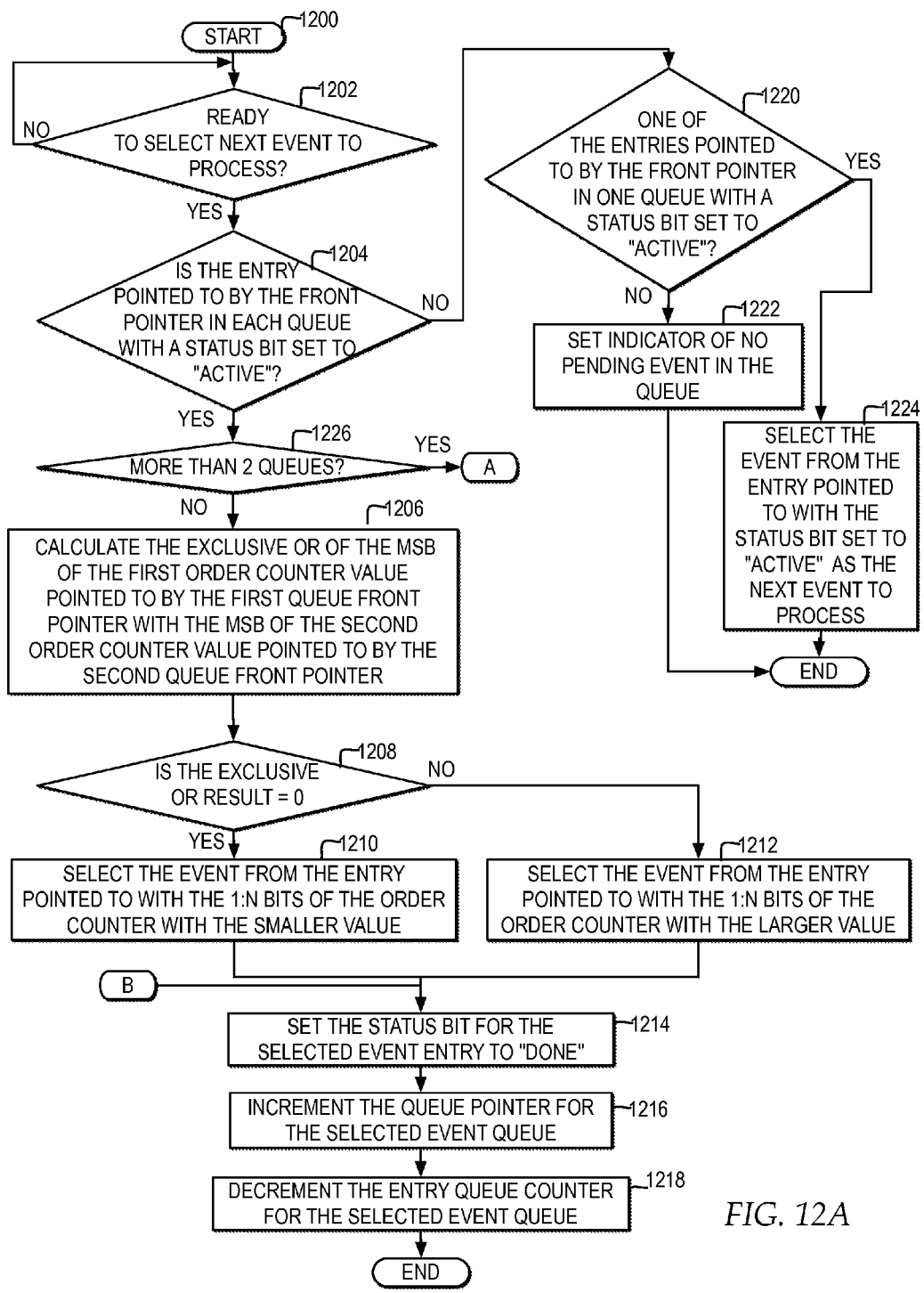
FIGS. 12A-12B illustrate a high level logic flowchart of a process and program for managing selection of a next event to process in a queue interface with multiple queues in which events are placed and in which the relative arrival order of events is tracked.
Figure 12B:
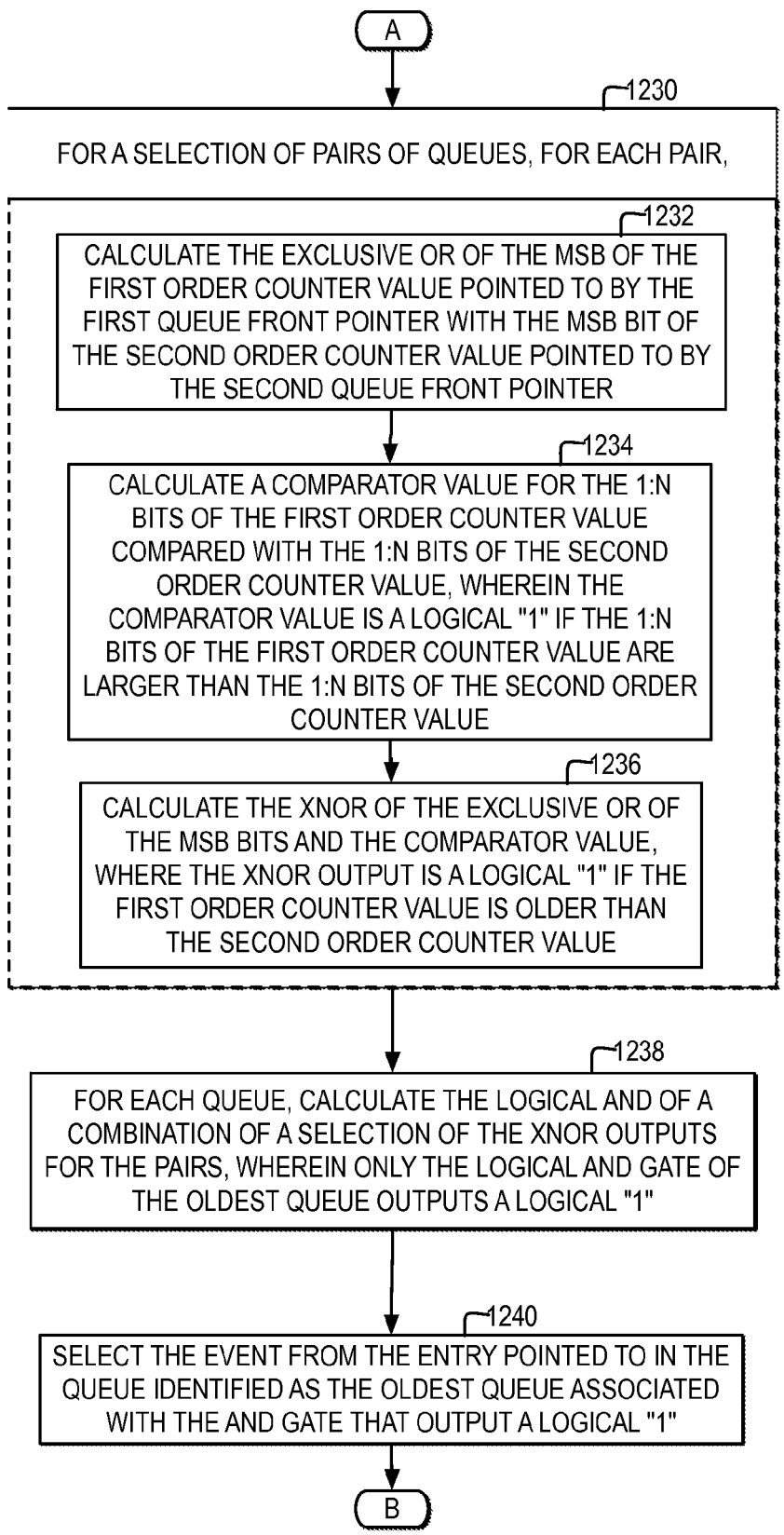

FIGS. 12A-12B illustrate a high level logic flowchart of a process and program for managing selection of a next event to process in a queue interface with multiple queues in which events are placed and in which the relative arrival order of events is tracked. In the example, the process starts at block 1200 and thereafter proceeds to block 1202. Block 1202 illustrates a determination whether the order controller is ready to select the next event to process. At block 1202, if the order controller is ready to select the next event to process, then the process passes to block 1204. Block 1204 illustrates a determination whether the entry pointed to by the front pointer in each queue has a status bit set to "active". At block 1204, if the entry pointed to by the front pointer in each queue has a status bit set to "active", then the process passes to block 1220. Block 1220 illustrates a determination whether one of the entries pointed to by the front pointer in one of the queues has a status bit set to "active". At block 1220, if only one of the entries pointed to by the front pointer in one of the queues has a status bit set to "active", then the process passes to block 1224. Block 1224 illustrates selecting the event from the entry pointed to with a status bit set to "active" as the next event to process, and the process ends. Returning to block 1220, at block 1220, if none of the entries pointed to by the front pointers in the queues have a status bit set to "active", then the process passes to block 1222. Block 1222 illustrates setting an indicator of no pending events in the queue, and the process ends.

Returning to block 1204, if the entry pointed to by the front pointer in each queue has a status bit set to "active", then the process passes to block 1226. Block 1226 illustrates a determination whether more than two queues are implemented for tracking events. At block 1226, if the number of queues implemented for tracking events is not more than two queues, then the process passes to block 1206.

Block 1206 illustrates calculating the exclusive OR of the MSB of the the first order counter value pointed to by the first queue front pointer and the MSB of the second order counter value pointed to by the second queue front pointer. Next, block 1208 illustrates a determination whether the exclusive OR value is equal to "0". At block 1208, if the exclusive OR value is equal to "0", where the comparator bit is set to "0", then the process passes to block 1210. Block 1210 illustrates selecting the event from the entry pointed to with the 1:N bits of the order counter with the smaller value, and the process passes to block 1214. Returning to block 1208, if the exclusive OR result is not equal to "0", then the process passes to block 1212. Block 1212 illustrates selecting the event from the entry pointed to with the order counter with the larger value, and the process passes to block 1214.

Block 1214 illustrates setting the status bit for the selected entry to "done". Next, block 1216 illustrates incrementing the queue pointer for the selected event queue. Thereafter, block 1218 illustrates decrementing the entry queue counter for the selected event queue, and the process ends.

Returning to block 1226, at block 1226, if more than two queues are implemented for tracking events, then the process passes to block 1230. Block 1230 illustrates, for a selection of pair of queues, for each pair, performing the process illustrated in block 1232, block 1234 and block 1236. Block 1232 illustrates calculating the exclusive OR of the MSB of the first order counter value pointed to by the first queue front pointer in the pair with the MSB of the second order counter value pointed to by the second queue front pointer in the pair. Next, block 1234 illustrates calculating a comparator value for the 1:N bits of the first order counter value compared with the 1:N bits of the second order counter value, wherein the comparator value is a logical "1" if the 1:N bits of the first order counter value are larger than the 1:N bits of the second order counter value. Next, block 1236 illustrates calculating the XNOR of the exclusive OR of the MSB bits and the comparator value, wherein the XNOR output is a logical "1" if the first order counter value is older than the second order counter value.

Next, block 1238 illustrates, for each queue, calculating the logical AND of a combination of a selection of the XNOR outputs for the pairs, wherein only the logical AND gate for the oldest queue outputs a logical "1". Thereafter, block 1240 illustrates selecting the event from the entry pointed to in the queue identifiers as the oldest queue associated with the AND gate that outputs a logical "1", and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for tracking a relative arrival order of a plurality of events stored in at least two queues, the system comprising:
   a processor, coupled with a memory, and configured to perform the actions of:
   storing each of a plurality of received events in a separate entry from among a plurality of entries in one of at least two queues with a separate counter value set from an arrival order counter at the time of storage, wherein the arrival order counter is incremented after storage of each of the plurality of received events and on overflow the arrival order counter wraps back to zero;
   calculating an exclusive OR value of a first top bit of a first counter for a first queue from among the at least two queues and a second top bit of a second counter for a second queue from among the at least two queues;
   comparing the exclusive OR value with a comparator bit to determine whether a first counter value in the first counter was stored before a second counter value in the second counter;
   for a plurality of queues greater than two queues, for each of a selection of pairings of the plurality of queues from among a plurality of selections of pairings of the plurality of queues:
      calculating the exclusive OR value of the first top bit of the first counter for the first queue from among each pairing of the plurality of queues and the second top bit of the second counter for the second queue from among each pairing of the plurality of queues, wherein the exclusive OR value is a logical "1" if the first top bit and the second top bit are not a same value;
      comparing, by a comparator, a first remainder of bits of the first counter with a second remainder of bits of the second counter to determine whether first remainder of bits is larger than the second remainder of bits, wherein the comparator outputs a logical "1" if the first remainder of bits is larger than the second remainder of bits; and
      calculating an exclusive NOT OR value of the exclusive OR value and the output of the comparator, wherein the exclusive NOT OR value is a logical "1" if the exclusive OR value and the output of the comparator are a same value, wherein the exclusive NOT OR value is a logical "1" if the first counter is older than the second counter;
   for each queue from among the plurality of queues, calculating a separate logical AND value from among a plurality of logical AND values of a separate logical combination of a separate selection of outputs from among the plurality of selection of pairings, wherein only one of the plurality of logical AND values calculates a logical "1" indicating on oldest queue;
   selecting, as an oldest entry from among the plurality of queues, a particular entry from a particular queue associated with the only one of the plurality of logical AND values that calculates a logical "1".

2. The system according to claim 1, wherein the processor is further configured to perform the actions of:
   responsive to the exclusive OR value matching the comparator bit, selecting a smaller value of a first remainder of bits of the first counter value and a second remainder of bits of the second counter value as a selected value;

responsive to the exclusive OR value not matching the comparator bit, selecting a larger value of the first remainder of bits of the first counter value and the second remainder of bits of the second counter value as the selected value; and selecting a particular entry stored with the selected value for processing next.

3. The system according to claim 1, wherein the processor is further configured to perform the actions of:

responsive to selecting the particular entry for processing next, setting a status bit stored with the particular entry from an active bit to a done bit and incrementing a pointer to point to a next entry in a particular queue from among the at least two queues with the particular entry.

4. The system according to claim 1, wherein the processor is further configured to perform the actions of:

incrementing the arrival order counter up to a maximum counter value of a number of entries in the first queue summed with a number of entries in the second queue less one before overflowing and wrapping back to zero.

5. The system according to claim 1, wherein the processor is further configured to perform the actions of:

receiving each of the plurality of received events at a receiving interface of an order controller;

determining, by the order controller, a particular classification from among a plurality of event classifications of a particular event from among the plurality of received events;

determining, by the order controller, if a particular queue from among the at least two queues associated with the particular classification is full;

if the particular queue is full, rejecting, by the order controller, the particular event;

if the particular queue is not full, storing, by the order controller, the particular event in the particular queue with a current value counted to in the order counter; and incrementing, by the order controller, the arrival order counter.

6. The system according to claim 1, wherein the processor is further configured to perform the actions of:

responsive to the order controller being ready to select a next event to process, determining whether a first status bit of a first next entry from among the plurality of entries in a first queue from among the at least two queues and a second status bit of a second next entry from among the plurality of entries in a second queue from among the at least two queues are both set to a done bit;

responsive to both the first status bit and the second status bit being set to the done bit, then no entry is processed;

responsive to both the first status bit and the second status bit not being set to the done bit, determining if only one of the first status bit and the second status bit is set to an active bit;

responsive to only one of the first status bit and the second status bit being set to the active bit, selecting the next event to process from the particular event from among the first next entry and the second next entry with particular event status bit set to the active bit; and responsive to both the first status bit and the second status bit being set to the active bit, calculating, by the order controller, the exclusive OR of the first top bit of the first counter value and the second top bit of the second counter value and comparing the exclusive OR value with comparator bit to determine whether to select the smaller or larger of a first remainder of bits of the first counter value and a second remainder of bits of the second counter value as the oldest entry.

7. The system according to claim 1, wherein the processor is further configured to perform the actions of:

comparing the exclusive OR value with the comparator bit to determine whether the first counter value was stored before the second counter value independent of a sequential order of the first counter value compared with the second counter value.

8. The system according to claim 1, wherein the processor is further configured to perform the actions of:

selecting a number of bits of the arrival order counter to count to two times the sum of each depth of the at least two queues, wherein the top bit of the arrival order counter represents an overflow bit and where the other bits of the arrival order counter represent a remainder of bits.

\* \* \* \* \*